US009514300B2

(12) United States Patent
Uner et al.

(10) Patent No.: US 9,514,300 B2
(45) Date of Patent: Dec. 6, 2016

(54) SYSTEMS AND METHODS FOR ENHANCED SECURITY IN WIRELESS COMMUNICATION

(75) Inventors: Eric Ridvan Uner, Carpentersville, IL (US); Anthony Kobrinetz, Hoffman Estates, IL (US); Martin H. Singer, Northbrook, IL (US); Joshua Scott Matthews, Baltimore, MD (US); Benjamin James Leslie, Enmore (AU)

(73) Assignee: Redwall Technologies, LLC, Beavercreek, OH (US)

( * ) Notice: Subject to any disclaimer, the term of this patent is extended or adjusted under 35 U.S.C. 154(b) by 0 days.

(21) Appl. No.: 13/323,340

(22) Filed: Dec. 12, 2011

(65) Prior Publication Data

US 2012/0216242 A1 Aug. 23, 2012

Related U.S. Application Data

(60) Provisional application No. 61/445,319, filed on Feb. 22, 2011.

(51) Int. Cl.
| | | |
|---|---|---|
| *G06F 21/51* | (2013.01) | |
| *G06F 21/50* | (2013.01) | |
| *G06F 21/56* | (2013.01) | |
| *G06F 21/52* | (2013.01) | |
| *H04L 9/32* | (2006.01) | |

(52) U.S. Cl.
CPC ............... *G06F 21/51* (2013.01); *G06F 21/50* (2013.01); *G06F 21/52* (2013.01); *G06F 21/566* (2013.01); *H04L 9/3234* (2013.01)

(58) Field of Classification Search
CPC ... G06F 11/30; G06F 11/3065; G06F 11/3072; G06F 21/50; G06F 21/51; G06F 21/52; G06F 21/566; H04L 9/3234
USPC .......................................... 726/1, 22, 23, 25
See application file for complete search history.

(56) References Cited

U.S. PATENT DOCUMENTS

| | | | |
|---|---|---|---|
| 4,493,021 A * | 1/1985 | Agrawal et al. ............... | 709/236 |
| 5,623,545 A * | 4/1997 | Childs et al. ...................... | 380/2 |
| 6,671,809 B1 | 12/2003 | Perona et al. | |
| 6,934,857 B1 | 8/2005 | Bartleson et al. | |
| 6,952,778 B1 * | 10/2005 | Snyder .............................. | 726/4 |
| 7,171,690 B2 | 1/2007 | Kouznetsov et al. | |
| 7,283,820 B2 | 10/2007 | Kamijo et al. | |

(Continued)

FOREIGN PATENT DOCUMENTS

WO 2010151859 A1 12/2010

*Primary Examiner* — Jung Kim
*Assistant Examiner* — Ngoc D Nguyen
(74) *Attorney, Agent, or Firm* — Wood Herron & Evans LLP

(57) ABSTRACT

A communication system having a policy server coupled to a communications network for managing secure communication with and among end instruments (EI). The EI comprises a memory, and a processor coupled to the memory with processor-executable instructions, including instructions for an operating system kernel; and instructions for a protection core that monitors operations of the operating system kernel in accordance with a security policy for the EI. Security policies can intercept calls to an operating system kernel and for each call, determining whether the call is allowed under the security policy(ies). Policies are stored in a policy library and transmitted to an EI over a wireless communication network.

19 Claims, 13 Drawing Sheets

(56) References Cited

U.S. PATENT DOCUMENTS

| | | |
|---|---|---|
| 7,401,230 B2 | 7/2008 | Campbell et al. |
| 7,607,173 B1 * | 10/2009 | Szor et al. ............... 726/25 |
| 7,634,559 B2 | 12/2009 | Brown |
| 7,665,125 B2 | 2/2010 | Heard et al. |
| 7,681,226 B2 * | 3/2010 | Kraemer et al. ............. 726/1 |
| 7,849,454 B2 * | 12/2010 | Lambert et al. ............ 717/168 |
| 8,230,515 B1 * | 7/2012 | Brewton et al. ............ 726/27 |
| 2002/0099952 A1 * | 7/2002 | Lambert et al. ............ 713/200 |
| 2002/0188724 A1 * | 12/2002 | Scott ............... G06F 21/316 709/225 |
| 2003/0009452 A1 * | 1/2003 | O'Rourke et al. ............ 707/3 |
| 2003/0041255 A1 | 2/2003 | Chen et al. |
| 2004/0010703 A1 | 1/2004 | Kouznetsov et al. |
| 2004/0193912 A1 * | 9/2004 | Li et al. ............ 713/200 |
| 2004/0213331 A1 * | 10/2004 | Peeters et al. ............ 375/146 |
| 2005/0005152 A1 | 1/2005 | Singh et al. |
| 2005/0102505 A1 * | 5/2005 | Chung ............... G06F 21/55 713/164 |
| 2005/0202803 A1 | 9/2005 | Mahalal |
| 2006/0075488 A1 | 4/2006 | Barrett et al. |
| 2006/0150256 A1 * | 7/2006 | Fanton et al. ............ 726/27 |
| 2007/0006159 A1 | 1/2007 | Hecht et al. |
| 2007/0177611 A1 | 8/2007 | Armstrong et al. |
| 2007/0204125 A1 | 8/2007 | Hardy |
| 2008/0034197 A1 * | 2/2008 | Engel et al. ............ 713/150 |
| 2008/0066148 A1 * | 3/2008 | Lim ............ 726/1 |
| 2008/0086776 A1 | 4/2008 | Tuvell et al. |
| 2008/0109871 A1 * | 5/2008 | Jacobs ............ 726/1 |
| 2008/0178256 A1 * | 7/2008 | Perrone et al. ............ 726/1 |
| 2008/0250217 A1 * | 10/2008 | Kershaw et al. ............ 711/163 |
| 2010/0138352 A1 * | 6/2010 | Witkowski et al. ............ 705/311 |
| 2010/0199086 A1 | 8/2010 | Kuang et al. |
| 2011/0047594 A1 * | 2/2011 | Mahaffey et al. ............ 726/1 |
| 2011/0209219 A1 * | 8/2011 | Zeitlin et al. ............ 726/23 |

\* cited by examiner

SYSTEMS AND METHODS FOR ENHANCED SECURITY IN WIRELESS COMMUNICATION

CROSS-REFERENCE TO RELATED APPLICATION

This application claims the benefit of priority to U.S. Provisional Application No. 61/445,319 filed Feb. 22, 2011, the entire contents of which is incorporated herein by reference.

FIELD OF THE INVENTION

This invention relates generally to wireless communications. More particularly this invention relates to a method and apparatus for implementation of a secure wireless communication device and an associated network.

BACKGROUND OF THE INVENTION

Communication using wireless communication devices, such as cellular phones, is not inherently secure. There are multiple ways that such communication can be compromised. Various approaches used currently to provide secure communication in wireless communication devices do not provide the security necessary for many government and commercial users.

SUMMARY

In one embodiment, a communication system comprises a policy server coupled to a communications network, and an end instrument (EI) configured to communicate with the server over the communications network, wherein the EI comprises a memory, and a processor coupled to the memory and configured with processor-executable instructions, including instructions for an operating system kernel; and instructions for a protection core that monitors operations of the operating system kernel in accordance with a security policy.

In embodiments, the policy server comprises a memory, and a processor coupled to the memory and configured with processor-executable instructions, including instructions to store a plurality of security policies for one or more EIs in a security policy library.

In another embodiment, a method of operating an End Instrument (EI) in a first security mode defined by a first security policy comprises intercepting calls to an operating system kernel; for each call, determining whether the call is allowed under the first security policy; and passing calls to the operating system kernel only when allowed by the first security policy.

In yet another embodiment, a method of managing the security posture of a plurality of End Instruments (EIs) over a wireless communication network comprises storing a plurality of security policies in a security policy library, and transmitting all or a portion of at least one security policy to at least one EI over the wireless communication network.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the various embodiments.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Figure 1:
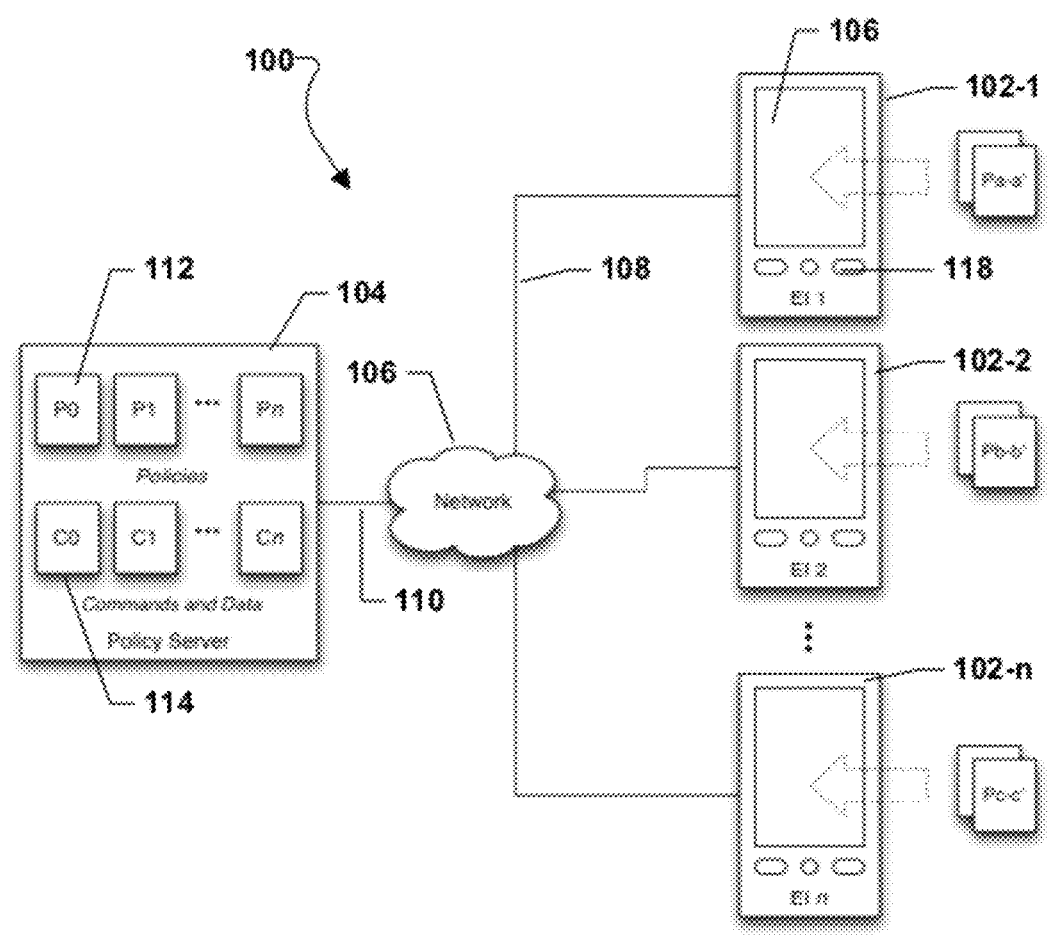
FIG. 1 is a communication system including one or more End Instruments (EIs) and a policy server according to one embodiment.

FIG. 1 illustrates an exemplary communication system 100 that includes one or more wireless communication devices, the End Instruments (EIs) 102-1, 102-2, . . . 102-n, as well as at least one policy server 104. The communication system 100 may make use of a wireless communication network 106, such as a cellular telephone network, a Wi-Fi network, a satellite or radio network, or combinations of various networks. The at least one policy server 104 may be coupled to the wireless communication network 106 by a data link 110, which may be via a local area network, the Internet, or another network such as a satellite or radio network. The wireless communication system 100 may provide wireless communication services (e.g., cellular data networks or Wi-Fi) for the plurality of EI's through wireless data links 108.

The policy server 104, which typically includes a processor coupled to a memory and may also include a number of connector ports coupled to the processor for establishing data connections the network 106, may in accordance with various aspects of the invention store policies 112, commands 114 and/or data for each of the respective EI's 102-1, 102-2, . . . , 102-n, as is described in further detail below.

The EI's 102-1, 102-2, ..., 102-*n* typically include a processor coupled to a memory and may further include an antenna and/or wireless transceiver for sending and receiving electromagnetic radiation over wireless link 108. In some implementations, the transceiver and portions of the processor and memory used for cellular telephone communications are collectively referred to as the air interface since it provides a data interface via a wireless data link 108. The EI's typically also include a display 116, which may be a touchscreen interface display, and may include interface button(s) 118, such as a keypad or miniature keyboard and/or menu selection buttons for receiving user inputs.

Each EI 102-1, 102-2, ..., 102-*n* may store in memory a set of policies and/or data (Pa-a', Pb-b', ..., Pc-c'), which may or may not be distinct from the policies and/or data stored on other EIs. Each EI 102-1, 102-2, ..., 102-*n* may also be configured to continuously interpret and process commands received from the policy server 104, which may include commands to update one or more policies.

The precise manner in which the respective EI's 102-1, 102-2, ..., 102-*n* and the at least one policy server 104 are connected via wireless network 106 is not critical to the various embodiments. For example, the EI 102 may be a tactical radio using a proprietary network interface in some embodiments, or it may be a smartphone using 3G protocols in other embodiments. Similarly, the policy server 104 may be connected to the Internet, or to a dedicated satellite network. In some embodiments, it may not be required for the EI 102 and policy server 104 to communicate at all after an initial provisioning process, and the initial provisioning process can be performed through a proxy or physical transfer.

Figure 2:
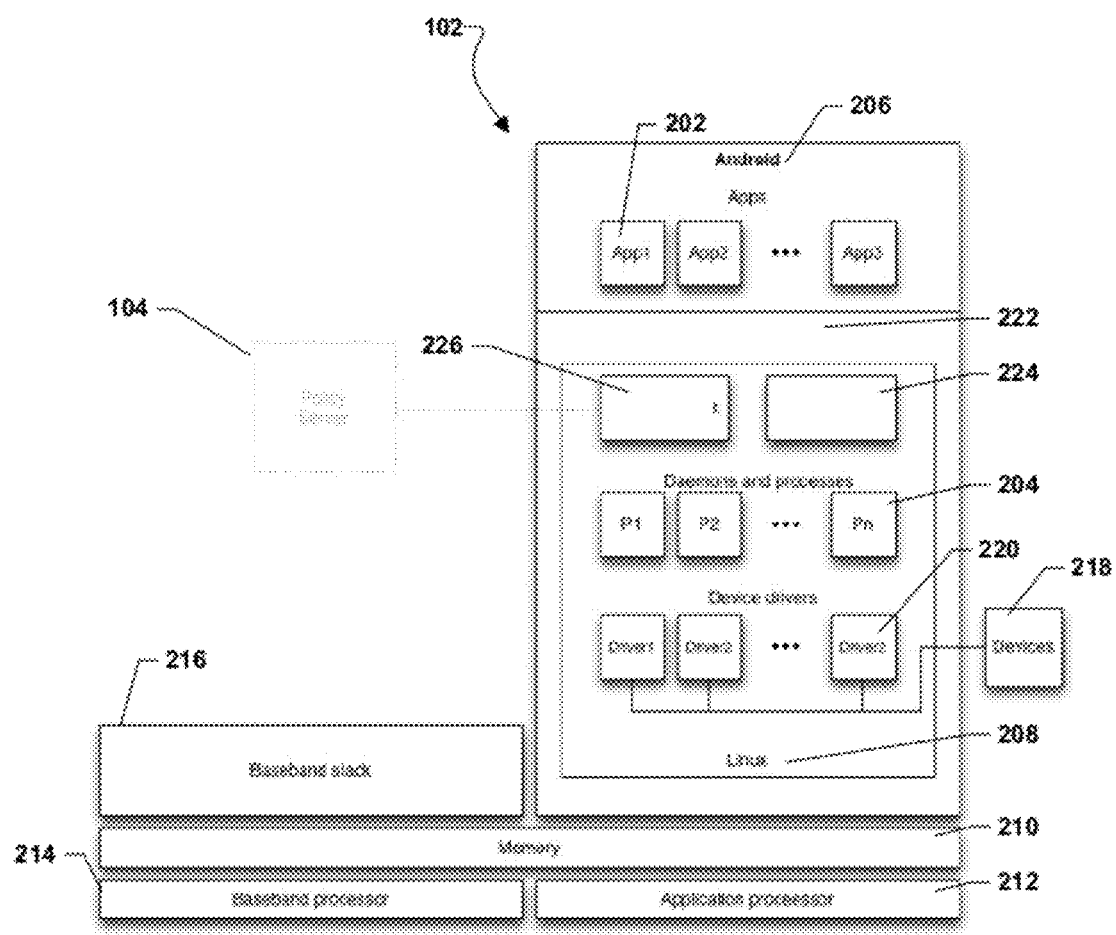
FIG. 2 schematically illustrates an End Instrument (EI) according to one embodiment.

FIG. 2 schematically illustrates various elements of an End Instrument (EI) 102 according to one embodiment. As is known in the art, the EI may include a combination of various hardware components and software components, where the software components may include processor-executable instructions to perform specified operations, and which may be embodied in a computer readable medium (e.g., a memory) on the EI 102. As shown in FIG. 2, in one embodiment the EI 102 may include one or more apps 202, which are user level applications or services, typically implemented in software, and may include, for example, the phone interface, calendar, Web browser, e-mail client, etc. They may be installed on the EI 102 by the user of the EI, or by an authorized administrator, network operator, the device manufacturer, from an app store or other online marketplace, or occasionally, by untrusted parties in the form of malware.

Daemons and system processes 204 are software processes which may run in the background, and the user and administrator may or may not be aware of them. They may perform maintenance tasks, or provide internal and external communication conduits between processes and devices. In a system running the GOOGLE® ANDROID™ mobile operating system, these processes run inside the operating system, and possibly inside the kernel 208. They often run with elevated privileges over a user's app 202.

The EI 102 may further include a mobile operating system 206, which in one embodiment may be, but is not limited to, the GOOGLE® ANDROID™ mobile operating system. In this context, the ANDROID™ operating system refers to the ANDROID™ native application framework, libraries, the Dalvik virtual machine, and any other elements of the ANDROID™ runtime environment. The mobile operating system 206 may include a kernel 208, which may be a Linux kernel, such as used in the ANDROID™ operating system.

The memory 210 may a volatile or non-volatile memory, and may be RAM or Flash memory storage, or any other permanent or temporary storage. In various embodiments, the memory 201 may include any computer-readable medium for storing data, such as security policies, and/or executable programs (e.g., software) for execution by a processor, including application processor 212 and/or baseband processor 214, described below.

The application processor 212 may interpret and execute program code, including but not limited to user applications (e.g., apps 202), the mobile operating system 206, including the kernel 208, daemons and processes 204, device drivers 220, etc. The application 212 may also interpret and execute program code for the protection core 222 as described in further detail below.

The baseband stack 216 is the element of the EI 102 responsible for source coding, channel coding, modulation (as well as the inverses of these), channel decoding and demodulation. The baseband processor 216 interprets and executes baseband code, including but not limited to code corresponding to the baseband stack 216. The baseband processor 216 may in some embodiments be a set of physical or virtual processors, and be single or multi-cored.

The devices 218 may include any peripherals or physical interfaces, such as network interfaces, microphones, speakers, accelerometers, motors, etc., or the associated chipsets to communicate to any such devices. The device drivers 220 may be software elements that the kernel 208 uses to communicate to devices 218.

In various embodiments, the EI 102 includes the protection core 222, which may be implemented in software, and which conceptually constitutes a thin layer surrounding the operating system kernel 208. The protection core 222 includes a security monitor that performs various operations, which may include monitoring for potentially dangerous system behavior and/or continually checking system integrity. Either or both of these operations may be performed pursuant to a security policy.

In various embodiments, the protection core 222 may surround the operating system kernel 208 to provide these protections on the applications processor 212 side of the EI 102. However, in embodiments the protection core 222 or a separate protection core process may operate on the baseband processor 214 side of the EI 102. Where the EI 102 includes multiple protection core processes running on the application processor and baseband processor sides of the EI, the protection core processes may cross check and cross verify each side.

To provide strong separation between the protection core 222, the individual processes inside the operating system (e.g., Linux) kernel 208, and the mobile operating system environment 206 (e.g., ANDROID™) itself, various embodiments may include modifications to the kernel 208 to support policy enforcement by the protection core 222 and enhanced memory management, which are described in further detail below.

In various embodiments, the EI 102 may include a protection core init subsystem 224, which may be implemented in software, and which may include processor-executable instructions to perform certain operations which may include communicating to the protection core 222 a security policy to enforce, and which may also participate in bringing up the protection core system during a policy activation. In addition to the subsystem itself, the protection core init subsystem 224 may provide an externally accessible Application Programming Interface (API). The mode switch API provides applications and processes, for example, a Mode Switch App, which may initiate a change from one security mode to another, i.e. to change which security policy or policies the protection core 222 is currently enforcing, in response to an input from a user or a policy server.

The protection core 22 may also include a protection core client subsystem 226 which may communicate with the policy server 104 to download policies, commands, and other data to the EI 102, and may also communicate with the protection core init subsystem 224 as required to process the incoming data and/or to send data to the policy server 104, such as request data about the status of the EI 102.

In various embodiments, the security enhancements to the EI 102 described herein, including the protection core 222 and/or modifications to the operating system kernel 208, may be implemented entirely in software (firmware), though it will be understood that at least some of these features could be implemented using hardware components, such as with a FPGA and/or ASIC.

Figure 3:
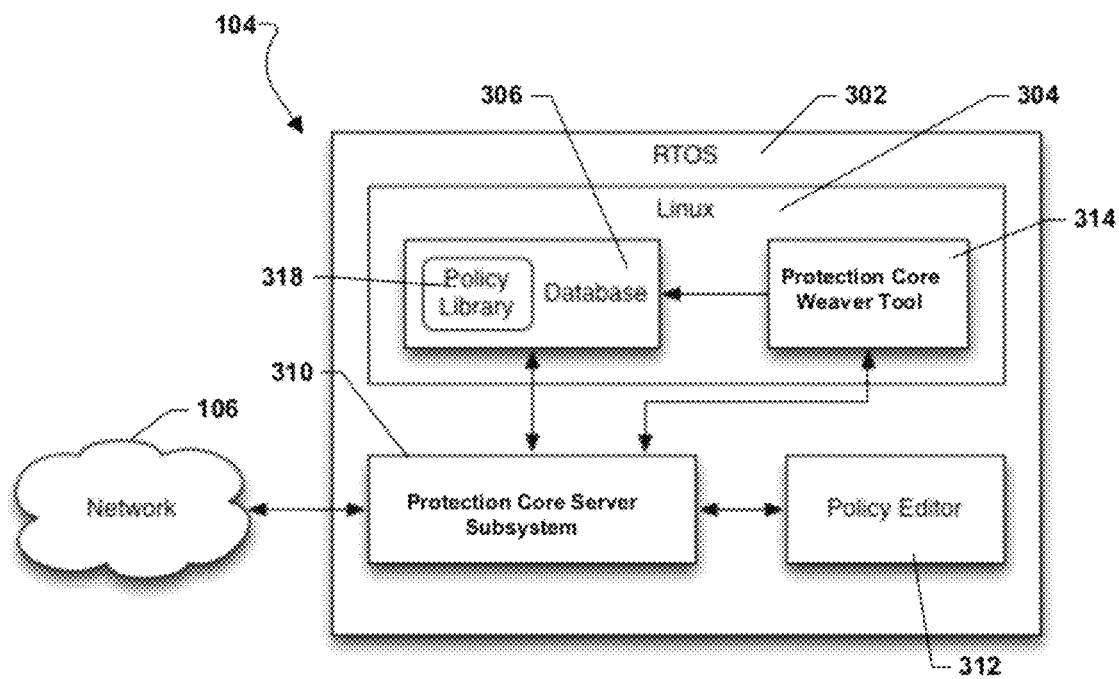
FIG. 3 schematically illustrates a policy server according to one embodiment.

FIG. 3 schematically illustrates a policy server 104 according to one embodiment. The policy server 104 may send commands, firmware, and/or other data to the EI 102 over network 106, and in embodiments the EI 102 may also query the policy server 104 at any time to see what behaviors might be allowed under what circumstances. The policy server 104 may also serve as the primary management console for controlling EIs 102 and creating firmware for the EIs 102. For example, in embodiments the policy server 104 may be configured to reboot, sterilize, and send other arbitrary commands to an EI 102. The policy server 104 may also enforce certain rules within its policies by acting as a data proxy or source to the EIs 102.

As illustrated in FIG. 3, the policy server 104 may include several elements, including typical server elements and other elements and/or subsystems that are used in implementing security enhancements according to the various embodiments. The policy server 104 includes at least one operating system, which may be a trusted Real-Time Operating System (RTOS) 302. The RTOS 302 may provide higher assurance and a smaller code base than an OS such as Linux. This trusted distinction, while not required for the architecture, may be beneficial because of the critical nature of the security posture of the policy server. For example, should an adversary control the policy server, they may gain access or control of a plurality of EIs 102. Since the policy server 104 may also incorporate third party tools and databases, however, it may additionally include a Linux or Unix operating system 304, which may run as a task within the RTOS 302. Many commercial RTOSs allow for such an arrangement.

The policy server 104 may also include a storage system 306, as is typical of server devices, and which may include a file system or database stored on media such as a magnetic or flash-based hard drive.

The policy server 104 may also include a number of server subsystems, including for example, a policy library 308, a protection core server 310, a policy editor 312, and/or a protection core weaver tool 314. The policy library 308, which may be a part of the storage system 306, may store security policy data for all EIs, as well as any outstanding commands, warrants, updates, instructions, or other data for the EIs.

The protection core server subsystem 310 may perform functions including, but not limited to listening for connections from EIs, sending queries to the policy library 308 for any outstanding data and commands for the EI, and sending such data and commands to the respective EIs.

The policy editor 312 may provide a user interface for authorized administrators to communicate to the policy server 104 using a Web browser or other application though the protection core server subsystem 310 to create and edit security policies, and enter data and commands either as templates or for specific EIs.

The protection core weaver is a tool that may run on the policy server 104 or offline to create firmware images for EIs. This tool creates a record of all images (e.g., the entire package of policies and code bundled to an EI) that exist at any given time for each individual EI that is registered to the policy server 104. This record confirms the policies that have been served to each individual EI and allows the policy server to update the policies as needed based on the version that is on the policy server as compared to the image on a particular EI.

In some embodiments, an EI 102 utilizing the present security enhancements may be prevented from receiving firmware updates from certain sources (e.g., from Google), or use the same updates as phones without the present enhanced security solution. In some embodiments, the updates must either come from the policy server 104, or from a proprietary system adapted to the protocols as defined in the API documentation, such as where the policy server 104 and protection core client 226 use open standards. Updates may also travel virally from EI to EI if the applicable policy allows it.

In overview, embodiments of the invention include a protection core 222 which runs on an EI 102 to enforce at least one security policy on an operating system 208, and preferably the operating system kernel 208. Whereas many security solutions for mobile devices (EIs) focus on specific known threats, the protection core 222 in various embodiments may focus on how the EI should behave when not under attack or influence by an adversary, and may treat any other behavior as a security danger. For example, a conventional virus scanner may look for a specific file as being dangerous, but the iscore 222 may instead look for unusual behavior, such as the microphone suddenly turning on when the device is not in an active call. Even when the cause of the behavior is not known, the protection core 222 may still stop the threat. This approach may be more effective in stopping both known and unknown security threats than a more traditional scanning and analysis technique.

Embodiments may include multiple, distinct security policies, each defining which processes may access which system features and what the EI 102 should do when that policy is put into effect. In embodiments, only one security policy may be active at a time. This may enable the EI 102 to operate in multiple modes, each corresponding to a different security context. The EI 102 may switch modes in response to user input and/or as directed by the system infrastructure (e.g., as directed by a server or another EI). Current "secure" mobile devices may provide a device that is highly-trusted, but so feature-limited the device is nearly useless. Sandboxing data and applications, while better than no security at all, is not as effective as providing temporal isolation (e.g., switching between security modes), such that applications in different security domains may not be permitted to run at the same time.

In embodiments, in the event of a violation of a security rule or suspicious application behavior is found, the protection core 222 may take appropriate "graduated" action depending on the violation of security policy. Such graduated action may comprise disabling a particular device or shutting the EI down, for example. The protection core 222 may include a series of instructions for taking protective actions in a layered fashion that reflects the severity of the threat detected. For example, the protection core 222 may direct that the application be shut down as one limit and/or the EI be shut down as another limit. Other actions may be for the EI to send an alert to the security policy server notifying of the violation and providing details of the violation including the application that triggered the violation, what actions were being attempted and what security countermeasures were triggered. Thereafter, the security server may analyze the information and communicate what, if any action should be taken by the smart phone.

Embodiments may further use "defense-in-depth" techniques to provide multiple layers of security and to increase the effort required by an adversary to compromise the security of the communication system. Embodiments may use biomorphic techniques to modify the operation of a memory of the EI 102, and to modify the way files are delivered to different EIs. "Biomorphics" in this context refers to the adaptation of each individual EI over time such that each individual EI or component becomes probabilistically unique over time to create ideal diversity as a defensive or survival technique against security threats that would otherwise jeopardize a network of devices, all of which would be the same. Additionally, over a period of time each individual EI may be configured to deviate from the initial deployed configuration and the associated initial conditions of EI, the longer the individual EI is running or the more input the individual EI receives. This has the effect of making each individual EI unique, so that an attack on one EI only can compromise that one device, and even then only for a short window of time. Thus, even if a skilled attacker breaks the encryption or finds vulnerability on one EI, the attack may be unlikely to work on any other EIs, and the attack may not work again on the first EI.

Figure 4A:
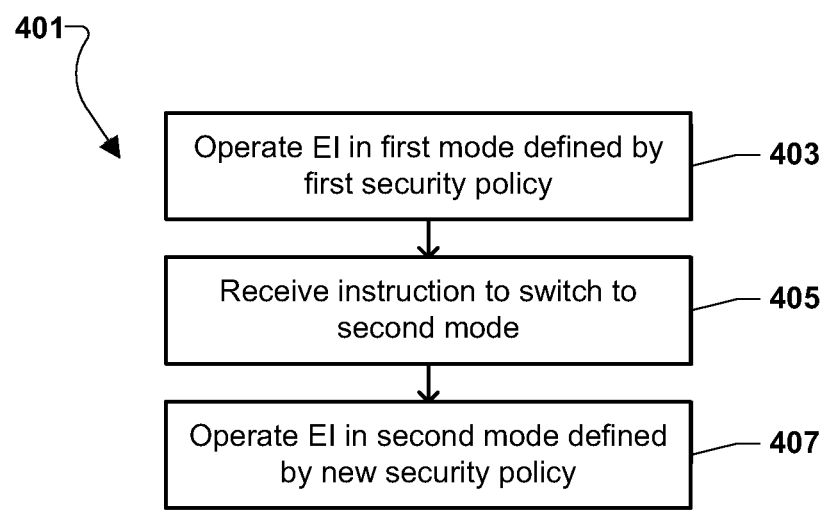
FIG. 4A is a process flow diagram illustrating an embodiment method of operating an EI in multiple security modes.

FIG. 4A is a process flow diagram illustrating an embodiment method 401 of operating an EI 102. In various embodiments, EIs 102 operate in one or more "modes," which may be defined by the security policy currently in effect on a particular EI. As shown in block 403, the EI may initially operate in a first mode. For example, if the user is a warfighter, during every day use the mode may be "Normal," and the policy in effect may allow typical personal use of the EI 102 just as if it were any conventional wireless device, such as a smartphone. In block 405, the EI 102 may receive an instruction to switch to a second mode. The instruction may be received from the user of the EI 102, such as via an input at a user interface, or it may be received from another entity, such by receiving an authenticated command from the policy server 104 to switch to a new mode. In some embodiments, the instruction to switch to a new mode may be received from another EI, or may be triggered by an event at the first EI 102, such as by the EI 102 receiving a communication from an EI operating in a different security mode. In response to the instruction, the EI 102 may switch to a second mode defined by a new security policy in block 507. For example, in response to a command from the policy server 104 to switch to "Tactical" mode, the EI 102 may switch from "Normal" mode to "Tactical" mode and a new operational security policy governs the operation of the EI 102. The security policy for "Tactical" mode may allow the EI 102 to only place secure calls to other known EIs, for example. In some embodiments, the EI 102 may only switch to a new mode if the switch is permitted by the security policy currently in effect. For example, if the EI 102 is operating in "Tactical" mode, the governing security policy may not allow the user to switch to another mode, and the switch to another mode may only be initiated in response to an authenticated command from a policy server 104 or other trusted entity.

In various embodiments, switching between modes and thus changing the security policy in effect of the multiple security policies stored on the EI 102 may be performed by the protection core init subsystem 224, described above. The protection core init 224 may inform the protection core 222 of a security policy change via a special system call available only to the protection core init subsystem 224.

Figure 4B:
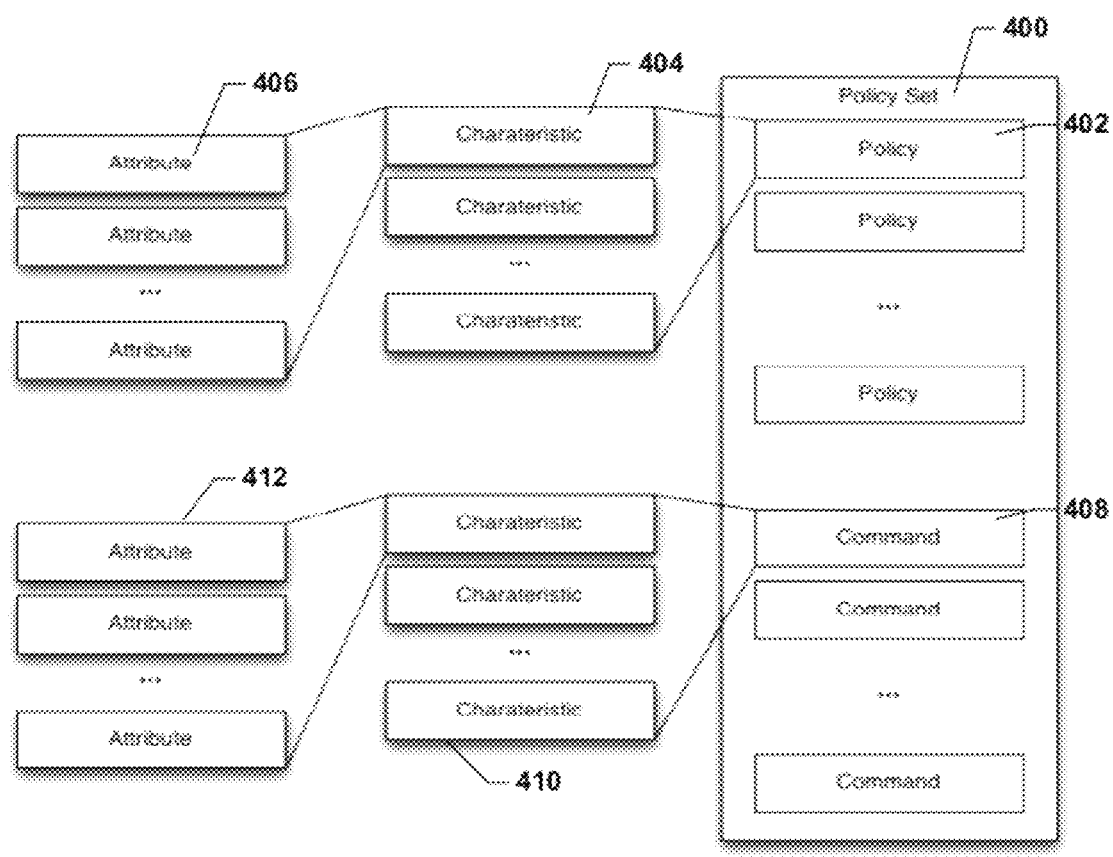
FIG. 4B schematically illustrates the structure of a security policy set.

In various embodiments, security policies may be used to determine what behaviors are allowed by the EI 102 in a particular mode. The security policies may achieve this by, for example, limiting the capabilities of the system, grouping capabilities into categories, and telling the EI what steps it must take when entering a mode. FIG. 4B schematically illustrates the structure of a policy set 400 according to one embodiment. The policy set 400 may include one or more policies 402. Each policy 402 may include one or more characteristics 404, and each characteristic may have one or more attributes 406. The policy set 400 may further include a set of commands 408 and data. Each command 408 may include one or more characteristics 410, and each characteristic may include one or more attributes 412. The commands 408 and data may or may not be specific to a particular policy 402 in the policy set 400.

Figure 5:
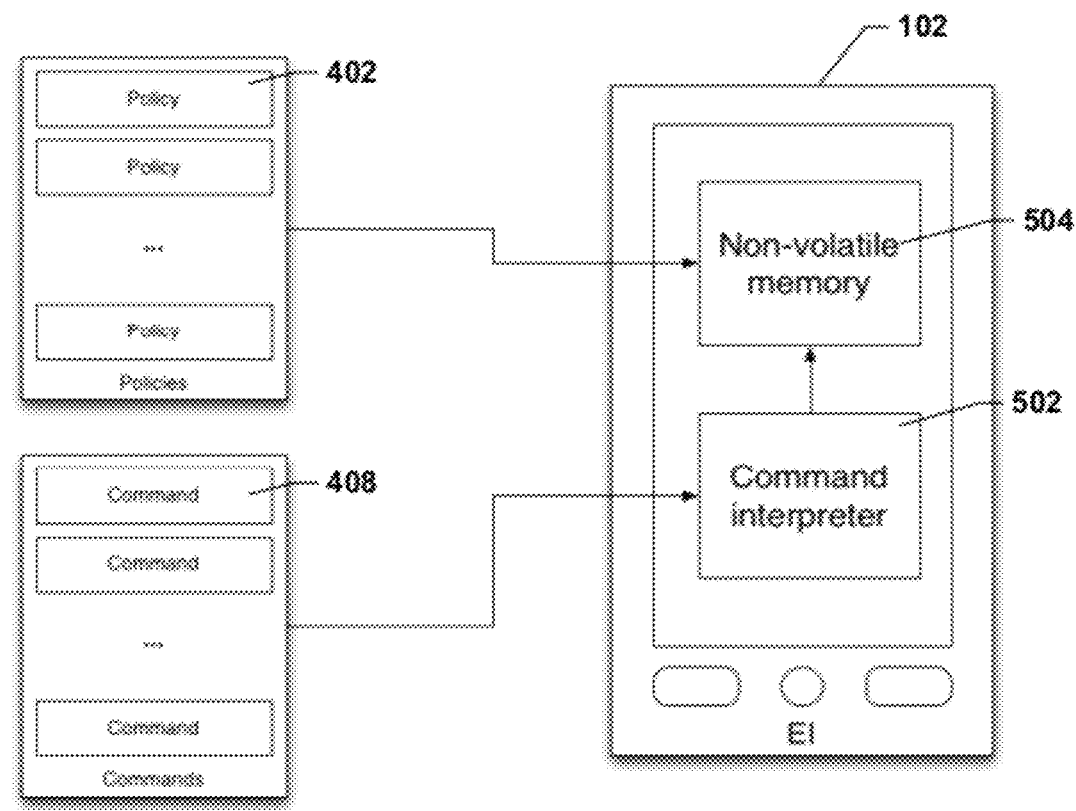
FIG. 5 schematically illustrates the policy and command interaction with an EI.

FIG. 5 schematically illustrates the policy and command interaction with the EI 102 according to various embodiments. A difference between the commands 408 and policies 402 is that a policy 402 may consist of static data that is stored by the EI 102 (e.g., in non-volatile memory 504), typically as part of the firmware, whereas the EI 102 may interpret commands 408 (e.g., using a command interpreter 502) and store in memory 504 only what data the command interpretation requires. The complete security policy set(s) for one or more EIs 102, including the various security policies 408, commands 408 and other related data, may be stored on a policy server 104.

Commands 408 may be instructions to an EI 102 (or group of EIs) to take a specified action. There is no constraint on the definition of these actions other than what is defined and hence understood in the EI firmware. Commands 408 may include, but are not limited to, the following examples:

Update or install: Update the policies or firmware, installing any specified firmware images and files, or applying any updates.

Perform attestation: Verify a set of requested parameters with another entity, which may be the policy server, a network server, and/or other EIs, as indicated in the specifics of the command. The verification may include proving the identity of the EI 102 through cryptographic mechanisms, verifying that a certain policy is in effect, forcing all internal integrity checks and reporting the results, and/or simply offering the contents, digital signatures, or hashes of the requested data.

Change policy: An instruction to the EI 102 to switch from one mode to another, i.e. to change which policy or policy set is in effect.

Data wipe: Erase (e.g., zeroise) all data indicated by the specifics of the command. The data could be from memory, including from semi-permanent storage.

Data lock: Encrypt all data indicated by the specifics of the command using a specified key. The data could be from memory, including from permanent or semi-permanent storage, and the key may be given by the command, already on the EI, or chosen by the EI.

Lock: Prevent all further use of the EI until a specified action takes place. The action could be an authentication using specified credentials (e.g. a password or a certificate), a device reboot, attestation, or completion of any other policy command.

Enable/disable propagation: Enable or disable the EI from sending commands and data to other EIs within range, and/or order them to begin to do so or cease to do so. The propagation can be optional or mandatory. The propagation command may enable so-called viral updates, which allow for both distributing data and enforcing policy changes among a plurality of EIs.

Update key: Update a specified cryptographic key with data which may be specified by the command, or if no data is given, generate a new value for the specified key.

In embodiments, the EI 102 may contain files, which may be stored in a memory, and which may be data files and/or executable program files and may be used to implement a security policy and/or respond to a command. Files may include, but are not limited to, the following examples:

Initialization script: The initialization script may be an executable program file that may be executed using the EI's operating system upon activation of a policy (or at boot, which activates the default policy). In the ANDROID™ operating system, this script is the init.rc file. In one embodiment, each security policy has its own init script.

Certificate: An X.509 or similar certificate containing cryptographic keys, key material, and identity information.

App: Applications that the user may launch.

Daemons and command line utilities: Background processes to launch when a policy is activated, or Command Line Utilities (CLUs) for those daemons or apps to invoke.

Firmware image: A new binary image or image update for the device. A firmware image is binary data containing the fixed data, policies, programs, micro-code, machine code, and other elements that the EI uses to operate. The EI typically stores the firmware image in flash memory or some other non-volatile storage.

Arbitrary file: An arbitrary file may be any data, such as an application, a document, or audio file, that the EI may store somewhere on its file system. An arbitrary binary or text file may be stored at a specified location.

Note that in the case of both commands and files, numerous third-party tools exist to perform remote mobile management, and these tools may either integrate with the security policies or, more likely, be independent of them. The commands and data support herein are generally meant only to support the security policy implementation, and not to provide or replace an overarching Mobile Device Management (MDM) solution.

Categories are defined compartments into which a security policy may place sets of programs and data to be partitioned or separated, and to control access to specific capabilities of the system. For each category, a policy can define various parameters, including, but not limited to:

ID: The ID of the category used to identify it from the other categories.

Available system calls: For each system call in the operating system, the policy may define whether or not processes in a particular category are permitted to make the system call.

File paths: The policy may specify a "deny" list of complete file paths and prefixes to which processes in a particular category have no access, and/or an "allow" list of complete file paths and prefixes to which processes in a particular category are specifically allowed to access, which may also include an access mode indicated if the process in the category can read, write, or execute the file or files in the specified path. For example, for a given category, the list could be defined as:

deny/
allow rx/system/bin
allow rw/sdcard
allow rwx/data/data/myscript.sh
allow rw/dev/ttymon*.

A process in this category would be allowed to:
1. Read and execute files in the directory/system/bin and all directories under it;
2. Read and write files in directory/sdcard and all directories under it;
3. Read, write, and execute the single file/data/data/myscript.sh; and
4. Read and write to devices that begin with/dev/ttyUSB (e.g. /dev/ttymon, /dev/ttymon005, etc.).

Attempts to read, write, or execute files anywhere else on the file system in this example will result in an error.

Subnets: The policy can specify a "deny" list of network IP addresses, hostnames, or subnets to which processes in a particular category have no access, and then a list to specifically allow access to. For example, for a given category, the list could be defined as:

deny*
allow 172.16.0.5
allow 10.*
allow vpn.a.disa.mil
allow loopback.

A process in this category would be allowed to:
1. Open network connections to and from the IP address 172.16.0.5;
2. Open network connections to and from all IP addresses in the 10.X.X.X network;
3. Open network connections to and from the host vpn.a.disa.mil, assuming that it could somehow be resolved to an IP address using an existing rule; and
4. Use networking between processes using the loopback interface (this rule could also be expressed as allow 127.*, or allow 127.0.0.1).

Attempts to communicate with other networks in this example will result in an appropriate error.

In some embodiments, there may be special categories with reserved names, including:

INIT: Processes in the "INIT" category have the ability to set the category of a process as it is created. According to some embodiments, once a process is placed in a category, it cannot be changed. Thus, the process must be killed (process must end) and be re-spawned by a process in the "INIT" category.

DFLT: The "DFLT" category is the default category, which the system may give to any processes for which the policy has not specified a category.

In embodiments, a security policy may specify how and when to perform integrity checking on specific data. In one embodiment, integrity checking may include performing a cryptographic hash on specified data and comparing the result to a known value to verify the data has not been altered either accidentally or maliciously. In one embodiment, the security policy may specify integrity checks on at least the following three types of data: a named data set that the integrity checking routine is aware of and processes though its internal logic, such as "kernel," or "self"; a file specified by the path to that file on the storage system; and/or a memory range specified by the inclusive starting and ending address.

The security policy may also specify different options on how to perform the integrity check, including, but not limited to:

an expected value to use (e.g. the specified value, the last known value) when performing the integrity check;

whether or not it is acceptable to have no known previous value if this is the first time running the check;

a specified algorithm to use (e.g. SHA256, a digital signature, CRC32) when performing the integrity check;

how often to repeat the check (which could be not at all for a startup test);

whether or not it is acceptable to stop during the integrity check to perform other tasks and free up the processor, and if so, to do so for fixed or pseudorandom intervals;

whether to check all the data from start to finish or to check portions of the data (e.g., selected pseudorandom blocks within the data);

what to do if the check fails; and/or an initialization vector, or additional data to include in the check. Security policies may also contain violation definitions, which define what actions the EI 102 must take when a policy is violated. For example, if the EI 102 attempts to access a blocked network, or attempts a restricted system call, the violation definitions may tell the EI 102 what action to take in response.

Violation definitions may be applied to entire policy sets, policies, characteristics, or attributes. Each container inherits its parent's violation definition, but may also override that definition with its own. In embodiments, the EI 102 may choose the violation definition with the smallest applicable scope. That is, violation definitions of attributes can override those of characteristics, characteristics of policies, and policies of policy sets.

The violation definition is in essence a pre-defined value of an enumeration of a set of possible actions. These actions could contain, but are not limited to:

Ignoring the violation

Logging the violation using the EI's logging capabilities

Informing the policy server of the violation

Changing to a different policy

Erasing data (data wipe)

Locking data using encryption

Locking the device and requiring re-authentication

Rebooting the device

Definitions may include combinations of these actions, such as informing the policy server and then rebooting the device. In cases where highly complex actions are required, the EI can change policies and execute a script as part of the startup process after entering into that policy.

Violation definitions may also include one or more thresholds, whereby the EI can take different actions based on the number of times the violation has occurred. In embodiments, the threshold can be static, meaning the counters do not reset to zero across reboots of the device, or upon leaving and entering the mode for the policy, or dynamic, in which the counters reset after a reboot of the device or upon first entering a mode for a policy.

Thresholds may be defined as a simple integer value, and when the number of violations exceeds the value, the EI 102 may take the specified action(s) in the violation definition. For example, a value of zero would mean to take the action upon the first violation, whereas a value if one would mean to take the action after upon the second violation (but before a third, e.g. "one violation is allowed").

One possible action of a violation definition can be to reset the violation counter, otherwise the actions will repeat upon each violation following the threshold.

Each security policy may include its own initialization script, which in an ANDROID™ system is init.rc. In order to support some of the security policy features, the initialization script (e.g., init.rc) may include several additional commands, including a command to set the category. This command may set the category of all processes forked from this point on to be in the name and mode specified. A verify command may perform the integrity check and/or decryption described by the arguments. A respawning command may indicate whether or not subsequent forked processes should be periodically restarted (where the approximate time between restarts may be set in the security policy).

In various embodiments, security policy definition files may be a binary representation or data structure containing the policy. In some embodiments, the policy definition files may be XML files, which may enable the files to conform to open standards such as the Open Mobile Alliance (OMA) and make parsing and editing the policy definitions relatively simple to implement. The policy data may be stored and transmitted in any format convenient to the policy server and EI, and embodiments may bypass the XML altogether in favor of a more efficient proprietary mechanism that maps to the policy server and EI data structures.

In various embodiments, the policies and commands preferably do not include any cryptographic material appearing as plaintext anywhere in the policy or command. In the event the material is not encrypted, it may be encoded with a scrambling function to perform a technique known as covering.

Policy data scrambling exchanges bits inside the data based on a key that both the sending and receiving party already have, can derive separately using zero-knowledge techniques, or can exchange out of band. For example, a message could use every other byte of the SHA-256 result of the plaintext of the previous message when sending the current message. The scramble cipher is meant to disguise data when an attacker may scan for known plaintext, but not to replace more robust cryptographic methods.

The scramble cipher may send a word, which may be a 32-bit big-endian word, along with the data as follows:

Bits 0-7: Scramble version

The version of the algorithm used

Bits 8-15: Scramble mode

One of several pre-defined modes so that the recipient of the data can choose the same mode and proper data to form the de-scrambling key Bits 16-31: Scramble IV Initialization vector, which the scramble algorithm incorporates into the key material, or as the only key material in the event that the algorithm is being used only to prevent basic plaintext scans and not to truly cover data.

Since the policy contains large, static blocks of predictable text, cryptographic methods to secure the transmission are vulnerable to attack. Therefore, in certain embodiments a protocol may be defined for securely transmitting the policy and all associated elements.

Figure 6:
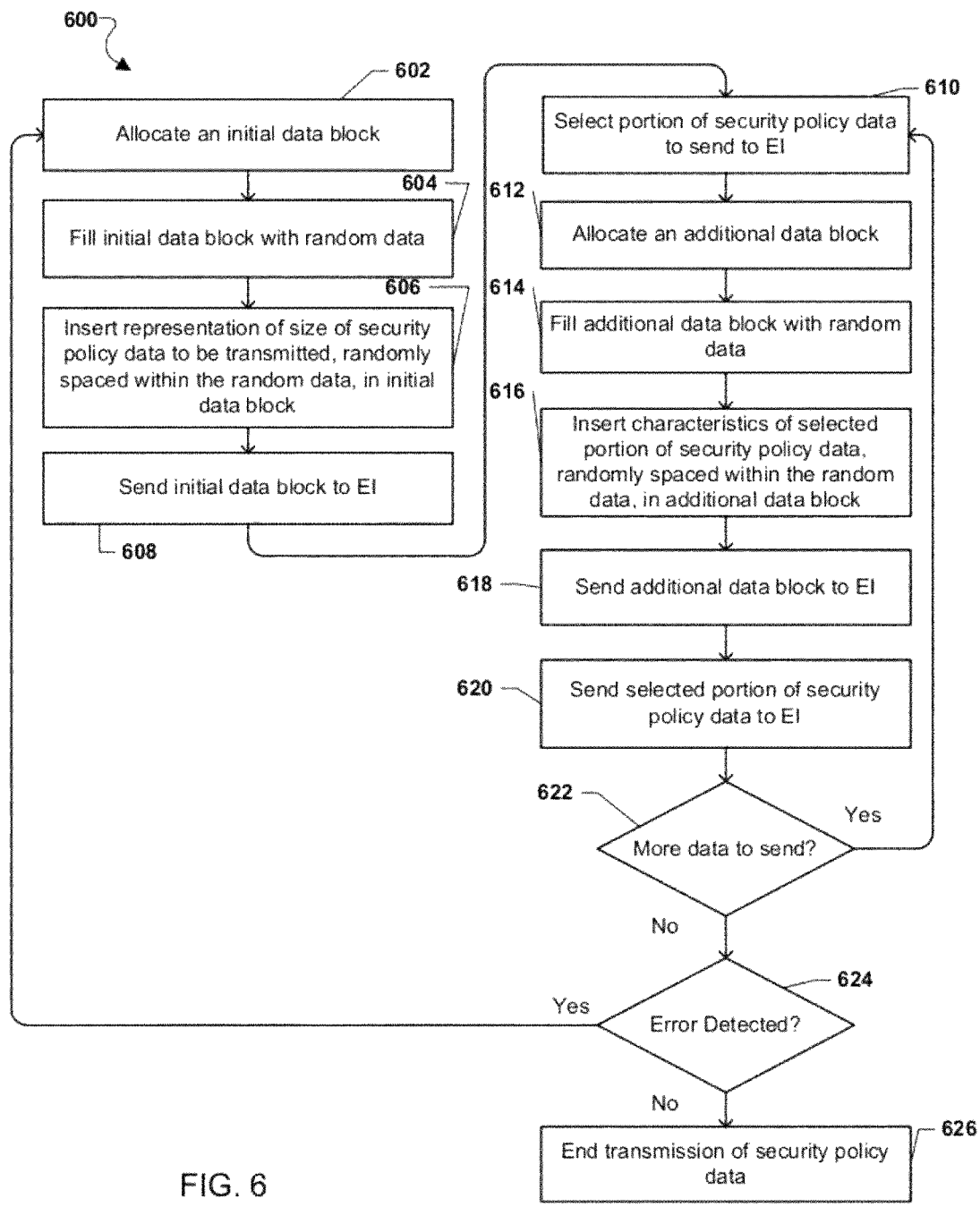
FIG. 6 is a process flow diagram illustrating an embodiment method of transmitting security policy data by a policy server.

An exemplary embodiment method 600 for transmitting security policy data, which may include policies and/or commands as described above, is illustrated in FIG. 6. The method 600 may be used to transmit security policy data from a security policy server 104 to an EI 102. In other embodiments, the method may be used by an EI 102 to transmit security policy data to another entity, including to another EI or to a policy server. In embodiments, the method may be designed to "blur" blocks of predictable data by both surrounding them with random data, and sending the true data out of order.

As shown in block 602, the server allocates an initial block of data, which may be a pseudorandom sized block of data. In block 604, the server may fill the initial block with random or pseudorandom data. The random or pseudorandom data may exclude the ASCII digits 0-9 and the ASCII NULL (ASCII code 0). In block 606, the server inserts a representation of the size of the policy and/or data to be transmitted, randomly spaced, within the block. The representation may be an ASCII representation of the size of the policy and/or data, with the digits in their proper order, but pseudorandomly spaced throughout the block. For example, if the packet block was of size 10, and the policy of size 345, the block would contain 7 pseudorandom characters and the digits 3, 4, and 5 at random places as in "J#3&g4h, d5.hFRq;" (with "." representing the ASCII NULL, and using only printable characters).

The server may send the initial block to the EI (client) in block 608. The EI may strip away non-ASCII digits in the data, and allocate space or otherwise prepare to receive data of the indicated size. In block 610, the server may select a portion of the policy and/or data to be transmitted, which may be a pseudorandom portion of the policy/data, preferably including mostly data it has not yet transmitted. The server may then repeat the "blurring" procedure, by allocating a block of data, which may be pseudorandomly sized, in block 612, and filling the block with random or pseudorandom data, which may exclude the ASCII digits 0-9 and the ASCII Null (ASCII code 0) in block 614.

In block 616, the server may then insert characteristics of the selected portion of the policy and/or data to be transmitted in to the allocated "blurred" block. In one embodiment, the characteristics may include the starting byte of the selected portion followed by length of the selected portion. For example, the server may insert the starting byte of the pseudorandomly selected portion followed by a NULL code, followed by the length of the portion and another NULL code. These characteristics may be inserted in their proper order, but pseudorandomly spaced. For example, if the selected portion of the policy is of length 10, and the sender is transmitting bytes 5-15, the "blurred" block could contain (with NULL represented as "." and using only printable characters) "5T1E.P!z0r.Tra&w", which effectively blurs the data "5 (NULL) 10 (NULL)." In block 618, the server may send the "blurred" block to the EI, optionally followed by an extra ASCII NULL. The EI (client), upon receipt of the blurred block, may decode the blurred block, discarding any extraneous ASCII NULL, and may then prepare to receive data of the indicated size. The server may send the selected portion of the security policy in block 620.

The server may then repeat blocks 612 though 620 until all of the data has been sent (i.e., block 622=No), at which point the process may terminate in block 626. If it is determined that an error has occurred (i.e., block 624=Yes), then the process may be restarted in block 602.

Figures 7A, 7B:
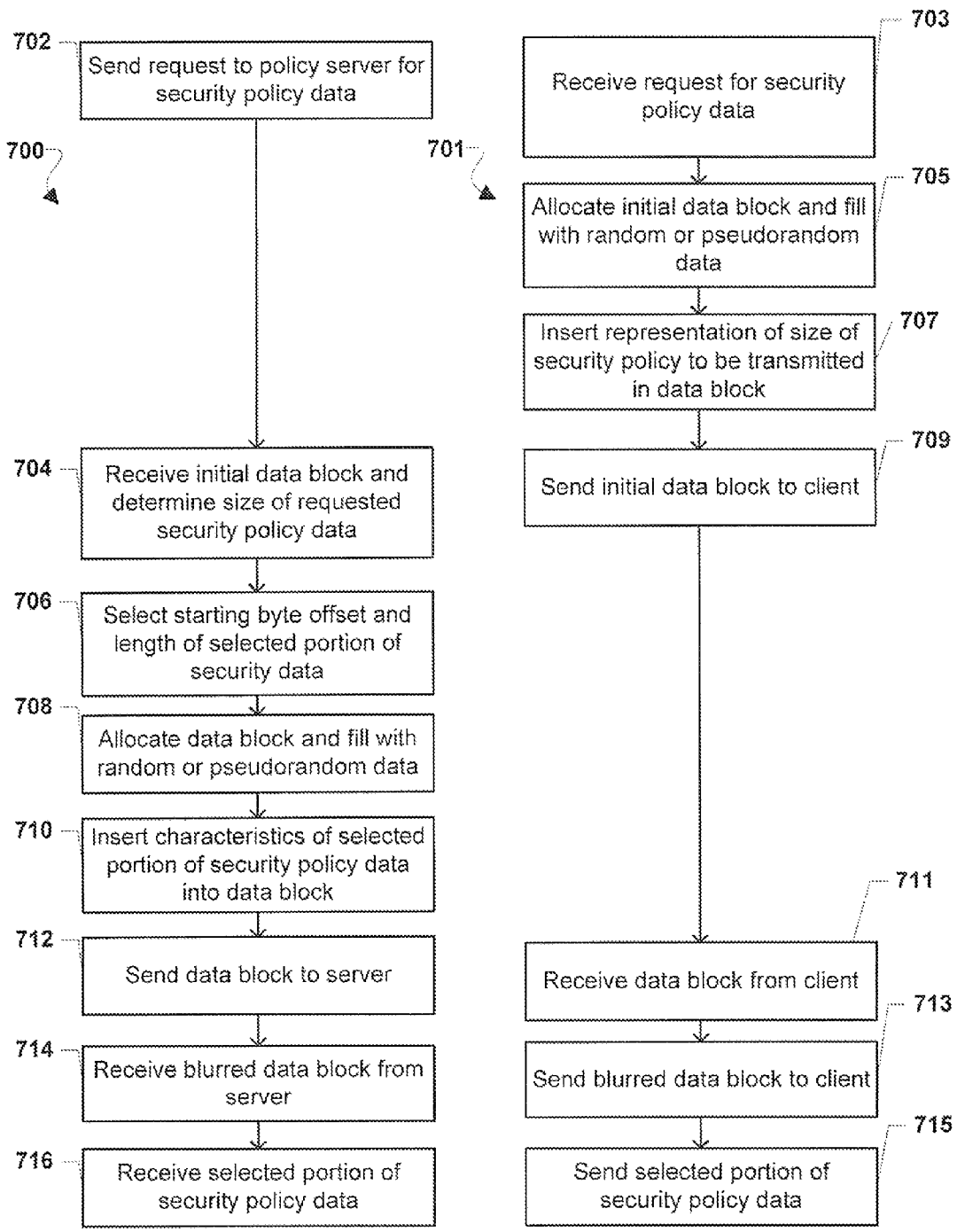
FIGS. 7A and 7B are process flow diagrams illustrating embodiment methods of requesting security policy data from a security policy server (FIG. 7A) and transmitting security policy data from a security policy server in response to a request (FIG. 7B).

To make the process more efficient, especially in a mobile environment, the recipient of the policy and associated data (e.g., an EI 102) may also initiate the request. FIG. 7A is a process flow diagram illustrating an embodiment method 700 for requesting security policy data from a security policy server 104. FIG. 7B illustrates the parallel method 701 of transmitting security policy data from a security policy server 104 in response to such a request. In block 702 of method 700, a client, which may be an EI 102, sends a request to a security policy server for security policy data in block 702. The server receives the request in block 703, and may allocate an initial data block, which may be a pseudorandom sized data block, and fill the initial data block with random or pseudorandom data in block 705, where this data may exclude the ASCII digits 0-9 and the ASCII NULL (ASCII code 0). In block 707, the server may insert a representation of the size of the security policy data to be transmitted in the initial data block. The representation may be a NULL (ASCII 0) terminated ASCII string representation of the size of the data in bytes, and the characters from the string may be inserted in their proper order, but pseudorandomly spaced within the initial data block. For example, if the initial data block is of size 16, and the security policy data is of size 345, the block may contain 12 pseudorandom characters and the digits 3, 4, and 5 plus an ASCII NULL at pseudorandom locations, as in "J#3&g4h, d5w.G;!s" (with "." representing the ASCII NULL, and using only printable characters). The server may send the initial data block to the client in block 709.

In block 704, the client may receive the initial data block from the server and may determine the size of the requested security policy data (e.g., by stripping away the non-ASCII numeric digits in the initial data block). The client may then allocate space or otherwise prepare to receive a policy of the indicated size.

The client may then select what portion of the data it would like to receive next by specifying the starting byte offset and length of the selected portion in bytes in block 706. The client may use a zero starting index to indicate a pseudorandom starting index and/or a zero length to indicate a pseudorandom length. The client may then utilize the same "blurring" process as described above in connection with FIG. 6 to hide characteristics of the requested policy data. More specifically, the client may allocate a data block, which may be pseudorandomly sized, and fill the block with random or pseudorandom data, which may exclude the ASCII digits 0-9 and the ASCII Null (ASCII code 0) in block 708. In block 710, the client may then insert characteristics of the requested portion of the security policy data (e.g., the starting byte offset and length of the selected portion) into the "blurred" block, preferably in their proper order, but randomly spaced through the block. The client may send the "blurred" data block in block 712.

The server may receive the "blurred" data block from the client in block 711. The server may decode the blurred block and determine the requested data to send in block 713. When sending the data to the requesting client, the server may use the "blurring" procedure described above, in which the server prepares and sends a "blurred" data block with the starting index and length of the data it is about the send, which may be followed by a single ASCII NULL, in block 713, and then sends the requested portion of the security policy data in block 715. The client may receive the blurred data block in block 714, decoding the blurred data and discarding the extraneous ASCII NULL, and receives the requested portion of the security policy data in block 716. The client may repeat the process until it has all the data it needs, or stop at any time by simply making no further requests Transmissions between the policy server 104 and EIs 102, or between two or more EIs 102, may be performed using conventional encryption methods, using a pre-shared key or other key material. Since an attacker does not have a known plaintext sequence to lock onto, cryptanalysis will be difficult if the encompassing protocol is properly implemented. (e.g., TLS with most cipher suites may not be appropriate, since that protocol introduces large known plaintext blocks).

In various embodiments, the protection core 222 may provide functionality for protecting the kernel from malicious malware through system call interception and on-line integrity checking. Embodiments may include modifications to the operating system kernel 208, described in further detail below, that may enable the protection core 222 to operate in a special privilege mode, and to offer new system calls with which code can access protection core functionality from outside this privilege space.

In one embodiment, the protection core 222 may include a system call filtering functionality, configured by a security policy, that may be used to protect the kernel 208 against threats such as fuzz attacks. The protection core 222 may also include code for performing all integrity checks on the kernel, itself, or any other data as specified in the governing security policy. The protection core 222 may also provide ancillary functions to defeat Differential Power Analysis (DPA) attacks.

In various embodiments, the protection core 22 may require cryptographic material which may be used in, for example, encryption, decryption, pseudorandom number generation (which circularly is sometimes co-dependent with encipherment), and/or initialization vectors for secure hashing.

Pseudorandom number generators (PRNGs) are an important tool for cryptography and a good security posture in general. It is a common misconception that truly random numbers are cryptographically secure, or that any algorithm passing a minimal set of statistical tests is secure. In fact, the entropy, or source of randomness, impacts the security posture of the algorithm.

In embodiments, the protection core 222 may have at least two layers of randomness and at least two modes, and a function requesting a pseudorandom numbers may select which layer and mode is required. A first layer (i.e., Layer One) may use a Substitution-box (B-box) and a feedback mechanism, as is known in the field of cryptology. A second layer (Layer Two) may pseudorandomly select from a plurality of S-boxes, making the results less predictable The two modes may include a first mode (e.g., normal mode), which provides no special functionality, and at least one second mode (e.g., FIPS mode) which ensures that the result conforms to the Federal Information Processing Standard (FIPS) 140-2 or higher.

According to one embodiment, in all layers and modes, the requesting function may choose to pass in a context, which will store the internal state of the PRNG across subsequent calls. The caller may also choose to reseed the PRNG in that context, or to use a temporary seed that will not change the internal state of the PRNG, but will give deterministic results (i.e. always give the same result for the same seed). The PRNG may include a default context that is used when the caller does not specify a context.

Key generation is often specific the algorithm used, however in embodiments the protection core 222 may provide key generation in accordance with the guidelines in FIPS 140-2 or higher and may implement all necessary functions for NSA suite B cryptography. Keys may be set by the governing security policy, though in embodiments there may be at least one protection core 222 root EI key, which the protection core 222 may generate upon finding that it does not exist, and then store the key. The protection core root EI key may be a private/public key pair, and the protection core may divulge the public key, but never the private key.

As with keys, certificates and certificate revocations can also be part of a security policy.

The protection core 222 may handle storage of cryptographic material, including keys, certificates, temporal references, version counters, and the policies that contain them, differently depending on the nature of the storage.

In embodiments, the protection core 222 may store cryptographic material that must be persistent across reboots in non-volatile memory, which could take the form of specialized hardware, an SD card, flash memory, etc. When stored in non-volatile memory, the protection core may encrypt and sign the material using the protection core root EI key, described above, with the exception of the root EI key itself, which may be encrypted with a device ROM key, stored in external secure memory, or provided by an external device (e.g. TPM or smartcard), depending on the available hardware features on the particular EI.

Preferably, the protection core 222 leaves cryptographic material in volatile memory (e.g. RAM) for as little time as practical. Since it may be impractical to constantly load and decipher or encipher the material, the protection core 222 may employ a scrambling function to perform a technique known as key covering. The scramble function may have two modes: bitwise mode and bytewise mode. Bitwise mode includes exchanging bits inside the given memory region. It is less computationally expensive than encryption, but not as robust. It may be used to disguise data when an attacker scans for known plaintext. Bytewise mode fills a buffer of pseudorandom size that is greater than or equal to the data to scramble, and then randomly places the bytes of the data to scramble pseudorandomly throughout the buffer. The two modes can be combined and a hash added to form a weak but fast cipher.

In preferred embodiments, the protection core 222 may store security policies statically as part of the image, i.e. they are built into the protection core 222 as needed. This can provide robust security, since the security policies generally form the base of the security model and posture of the system. In other embodiments, the protection core 222 may allow for dynamic security policies. With the static configuration, changing the policy may involve an update to, at the very least, the protection core subsystem, and a reboot of the EI 102.

In various embodiments, the protection core 222 may perform run-time integrity scanning to determine whether specified data have been altered from their expected values. The governing security policy may determine exactly what integrity checks are performed and how often. The protection core 222 may contain the necessary timers and algorithms to support those options, and may expose the interface to the algorithms via an API in the form of one or more special system calls.

In addition to the API granting the ability to perform the arbitrary integrity checks on files and memory, there may be a set of pre-determined checks that the protection core 222 runs internally upon certain events, or that may be requested via the API. These pre-determined integrity checks may include, but are not limited to:

Boot check: At boot or upon request, the protection core 222 may automatically perform an integrity check of the entire image.

Known answer tests (KATs): At boot or upon request, protection core 22 may perform a series of tests on all cryptographic routines and verifies they return expected results.

Security Policy checks: At boot up, the protection core 222 may verify one or more security policies, or all security policies, and may also verify a specific security policy by name on request.

Self check: The isocore 222 may perform a self check upon request, or at pseudorandom intervals. The governing security policy may determine how frequently to perform these checks, as more frequent checks may improve the security posture but degrade EI performance and battery life.

Kernel check: The protection core 222 may perform a check on the entire kernel upon request, or at pseudorandom intervals. The governing security policy may determine how frequently to perform these checks, as more frequent checks may improve the security posture but degrade EI performance and battery life.

The security policies may determine what action to take on an integrity check failure, and a default action may be to panic the system and attempt a reboot, halt, or infinite lock on the system until an external force applies a power cycle, depending on the capabilities of the EI 102.

The protection core 222 may further provide system call interception. Invalid system calls, and specific parameter checking may be provided in a trusted manner by the protection core 222 to protect against potential bugs within the operating system kernel 208.

When a process is created (e.g., forks), the protection core 222 may intercept the fork and, based on the governing security policy, place the process in the proper category. The protection core 222 may place processes forked from an existing process into the same category, with the exception of processes in the INIT category, which have the ability to tell the protection core 222 to place their processes in a specific category.

Figure 8:
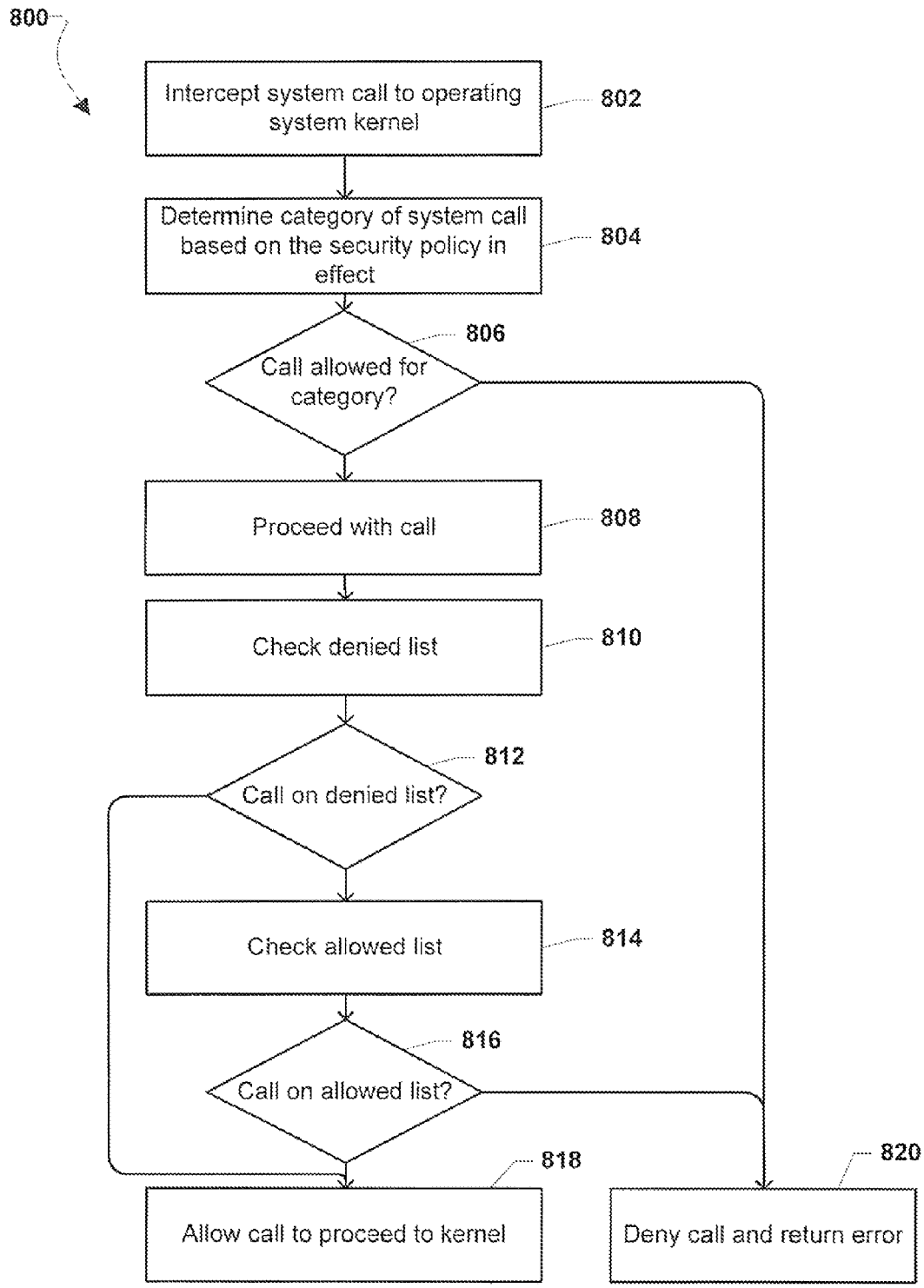
FIG. 8 is a process flow diagram illustrating an embodiment method of intercepting system calls to an operating system kernel by a protection core.

An embodiment method 800 of intercepting system calls to an operating system kernel by the protection core 222 is illustrated in FIG. 8. Upon initiation of a system call by a process in the EI 102, the protection core may intercept the system call in block 802. The protection core 222 may determine the category of the system call based on the security policy currently in effect at block 804. If the call is allowed in the applicable category (i.e., block 806=Yes), then the protection core may proceed with the call in block 808. If the call is not allowed (i.e., block 806=No), then the protection core 222 may deny the call and return an error in block 820.

For calls that involve networks and/or files, the protection core 222 may check the denied list as defined in the governing security policy to determine whether the system call should be denied in block 810. Where the call is not on the pre-defined denied list (i.e., block 812=No), the protection core 22 may allow the call at block 832. If the call is on the denied list (i.e., block 812=Yes), then the protection core 222 may check the allow list as defined in the security policy to determine whether the system call should be allowed at block 814. Where the call is on the pre-defined allow list (i.e., block 816=Yes), the protection core 222 may allow the call to proceed to the kernel at block 818. Where the call is not on the allow list (i.e., block 836=No), then the protection core 222 may deny the call and return an error in block 820.

In some embodiments, the protection core 222 may specifically deny some system calls, paths, or networks, even if the policy allows them. When there is a conflict between the policy and the protection core, the protection core's rules and logic may apply in certain embodiments.

In embodiments, the protection core 222 may provide defenses against Differential Power Analysis (DPA) and timing attacks. DPA attacks attempt to extract keys by measuring the power usage by the system. Timing attacks measure the time it takes the system to respond to glean information about key material and other aspects of the security process. True resilience against these attacks generally requires specialized hardware such as FPGAs, EMI shielding, etc. However, the protection core 222 may utilize techniques used in secure embedded systems to offer resistance against these types of attacks.

In one embodiment, the protection core 222 employs pseudorandom delays to protect against certain types of attacks. The protection core 222 may provide a function that will not return until some time between the minimum and maximum specified time has elapsed. The rest of the protection core 222 may or may not continue to run during this time. This helps to defeat timing attacks by obfuscating the time it takes a given cryptographic function to return, especially in cases where there is an error, where the time to return is often a strong indicator during cryptanalysis and other attacks.

In some embodiments, the protection core 222 may include pseudorandom CPU spinning. In particular, the protection core 222 may provide a function which, when invoked, pseudorandomly calls all the available cryptographic routines, and performs read accesses on pseudorandom memory areas. Each routine and read combo is considered a spin cycle, and the caller can specify a number of cycles to execute before continuing.

While this defense is immediately obvious to an attacker with physical adversary to the device, an adversary watching the power consumption (either wired or via EM fields), will see only a sudden increase in power consumption, and the nature of the cryptographic routines and the memory accesses will cause the power usage to be random enough to obfuscate any true error handling or real power consumption when called wisely.

The protection core 222 may further include one or more ancillary features, including for example, mechanisms to decrypt and flash (depending on the hardware capabilities of the EI) the firmware images.

In certain embodiments, the operating system kernel 208 may be modified to provide certain features, including enabling the protection core 222 to operate in a special privilege mode, to offer new system calls with which code can access protection core 222 functionality from outside this privilege space, and to perform some of its base functionality.

In overview, the kernel 208 modifications may be similar to techniques originally applied to virtualization software, and they are designed to enhance the robustness and integrity of the kernel, which in one embodiment is a Linux kernel.

Along with the protection core 222, the modifications may ensure that the kernel 208, most notably its "text" segment, cannot be modified during execution, removing a large attack vector from the EI 102. The kernel's text segment is where the operating system program code resides. If this code is modified, it causes the behavior of the operating system to change, potentially removing security checks, introducing code from an adversary, or even defeating, through impersonation, some of the protection core's features. Embodiments may make novel use of the ARM hardware's Memory Management Unit (MMU), including pagetables and domains, and these changes may ensure that this text cannot be modified.

A combination of off-line analysis tools and online checks by the protection core 222 may be used to ensure that the kernel 208 cannot remove these enhanced protections. As used herein, "off-line" analysis includes scanning a particular code or portion of code for certain instructions, op codes, or patterns, and includes scanning in real-time as the kernel or kernel module is loading while the code being scanned is not yet executing (i.e., it is not yet "on-line").

In embodiments, one implementation change to the kernel 208 is the addition of a security monitor. The security monitor may create a "secure zone" inside the kernel 208 to protect "privileged" kernel instructions and data against the rest of the kernel code.

Conceptually, the technique adds a third privilege level to the operating system (e.g., Linux). In addition to the existing kernel mode and user mode, embodiments may add a "super-privileged" mode, or Secure Monitor Mode (SMM). The security monitor may move a task up or down by one level at a time to carry out operations in different levels.

To isolate the security monitor, its code and data may be located in a secure section distinct from the rest of the kernel, and an API may be used to enter and exit SMM, just as a Linux uses system calls (and other exceptions) to switch between user mode and kernel mode.

In embodiments, the security monitor may use ARM domain memory access control, combined with an off-line ARM instruction scan tool. The technology may be implemented on a variety of architectures, including on any ARM core with the domain feature, and on any operating system. Furthermore, although reference is made to certain architectures, including the ARMv6 and ARMv7 architectures from ARM Holdings, plc (Cambridge, UK), both of which may be utilized with the present invention, it will be understood that embodiments may use other processor architectures, now known or later developed.

In embodiments, the security monitor may protect critical parts of the kernel against code that may be able to run in privileged mode by essentially creating a super-privileged layer against normal kernel, which it relegates to a less privileged layer (but still higher than user mode). Only a small amount of code can run in the super-privileged mode, and this code monitors the rest of the kernel code and protects the kernel from malicious attacks or kernel bugs.

The security monitor utilizes the access domain feature of the processor combined with modification to the operating system's memory mapping to create a "super-privileged" layer in the kernel, which may be without the drawbacks of virtualization.

Embodiments may include changes to the memory mapping performed by the operating system. There are a number of security issues in existing systems (e.g., Linux-based systems) that may be addressed by the various embodiments.

For example, in a conventional Linux-based system, the entire kernel direct-mapping area that includes the kernel text and data segments has full access permission in privileged mode, and thus has no defense against code running in privilege mode, which includes Loadable Kernel Modules (LKM). This means that any user who can access the file system where the LKM binaries are stored is able to change kernel code and data. There are many explanations as to why LKMs exist and the security compromises they bring to the system. Linux assumes we can "trust" the LKMs, and it is with this in mind, together with the fact that direct-mappings are created in boot time using ARM assembly, it is not surprising that Linux implements the mapping this way.

This mapping is created at the same time that one-to-one physical mapping is created, which is before the Memory Management Unit (MMU) is enabled. It is almost impossible to allocate a second level page table at that time without breaking the memory management system Linux later uses. Therefore, the minimum security section unit is 1 MB, and it obviously cannot fit Linux kernel sections without creating memory segmentation or a large increase in kernel image size.

Also, it is somewhat inefficient that although most ARM V6 cores support dual page table and split address spaces, Linux chooses to use the same mechanism as it does in AMR V5 instead of the same as in ARM V7. This may be for reasons of backwards compatibility with earlier ARM V6 cores. However, a consequence of such a mechanism is duplicated kernel address mappings in all address spaces. This redundancy makes it difficult to protect these mappings from malicious processes.

In addition, in existing Linux-based systems, the PTEs ($2^{nd}$ level page tables) are allocated from SLAB, which could be any address in the RAM, which makes it difficult to monitor the memory mappings.

In embodiments, the security monitor feature of the kernel 208 may include several memory mapping rules that provide increased security. In one embodiment, all critical data may be placed in a secure segment. The secure monitor code and data may be stored in a contiguous memory segment with domain set to be domain_monitor. The kernel address space 1st level page table (section table) and 2nd level page table may also be allocated from this segment. This segment may also include the .init section, which is not freed after boot time, since the monitor checks the integrity of the kernel boot code as well.

An exemplary embodiment of a memory layout of a kernel 208 with a security monitor is illustrated in Table 1:

TABLE 1

| Range | Section Name | Notes | Access Permissions |
|---|---|---|---|
| 0x80000000-0x80004000 | | Not used | Domain monitor, R/W |
| 0x80004000-0x80008000 | | Used as pgd (1st level page table) for kernel address space | Domain monitor, R/W |
| 0x80008000-0x80008400 | .text.head | Assembly boot head code | Domain monitor, R/X |
| 0x80008400-0x80300000 | .init | All ".secure_monitor.*" sections, including kernel 2nd page table. | Domain monitor, R/W/X |
| 0x80300000-0x80783000 | .text | Text segment | Domain kernel, R/X |
| 0x80783000-0x809e4000 | .rodata | Read only data | Domain kernel, Rd only |
| 0x809e4000-0x80a24ee0 | .data | Data section | Domain kernel, R/W |
| 0x80a24ee0-0x80a2a000 | .bss | BSS section | Domain kernel, R/W |
| 0x80a2a000-0x8d200000 | | Free RAM, will be added in free list, used by SLAB | Domain kernel, R/W |

As the table shows, the area 0x80000000–0x80300000, is set to monitor the segment mapped to domain_monitor. When the Domain Access Control Register (DACR) is set so that the domain_monitor has no access permission, and any access from any mode (privileged mode or user mode) will generate a domain fault. Also, the kernel PGD ($1^{st}$ level page table) and PTE ($2^{nd}$ level page table) are always allocated from this segment. The absolute size of the PTE is calculated as:

PTE size=0x100000($1^{st}$ level page size)/4(bytes per entry)=0x400Total PTE size=x100000000(4 GB memory bus limit)−0x8d800000(VMALLOC_START)/0x100000(1 MB)*PTE size=0x1CA00

Therefore, the size of the monitor segment needs to be larger than 0x1 CA00, and should be aligned on a 1 MB boundary, since a domain may only be set in the 1st level page table entry. Considering the code and data section for the security monitor and init, 3 MB is a typical size. If the user address space page tables are also allocated from this segment, the segment may be larger. However, there are typically only a small number of PTEs in kernel address space, therefore, for efficient memory usage, the system can choose to reduce the size of security monitor segment, keeping in mind the 1 MB minimum.

In embodiments, the security monitor may also use a split page table. The address space switch may be similar to that in an ARM V7 system. Specifically, the Translation Table Base Control Register (TTBCR) may be set so that Modified Virtual Address (MVA) translation less than 0x80000000 goes to Translation Table Base Register 0 (TTBR0), and MVA translation equal to or greater than 0x80000000 goes to Translation Table Base Register 1 (TTBR1). There is no need, therefore, to copy kernel mappings across address spaces, and kernel address space may be located on a fixed physical address.

In various embodiments, the kernel address space (excluding the security monitor segment described above) may only have three privileged access permissions, and no user access permissions. These may include privileged Read Only, which may be for rodata segment, privileged Readable and Writable, which may be for the data segment including kernel address space $1^{st}$ and $2^{nd}$ level page tables, and Privileged Readable and Executable, which may be for the text segment. In one embodiment, there are no allowed Writable and Executable permissions, which can help prevent self-modifying code in kernel mode, which could be from an LKM.

In embodiments, only the security monitor has access to kernel $1^{st}$ and $2^{nd}$ level page tables, since the page tables are allocated from the security monitor segment. Therefore, change of access permission and physical address is not possible for privileged but non-security monitor kernel code or user code.

In summary, in one embodiment of a security monitor, there is a special segment in kernel address space, having an associated domain (e.g., domain_monitor), other than domain_kernel, domain_user or domain_io in normal Linux mappings. The $1^{st}$ level and $2^{nd}$ level page tables for kernel address space, as well as the $1^{st}$ level and $2^{nd}$ level page tables for user address space may be allocated from the monitor segment. All security monitor text and data sections, as well as Linux init text and data sections, may be located in the monitor segment. Modification of the Domain Access Control Register (DACR) may only be done by code in the monitor segment and memory abort exception handler, as guaranteed by off-line verification tools, only kernel and LKM binaries verified by the off-line verification tools may be installed on the system. Writes to TTBRs and the TTBCR may only be done by the monitor segment, and writes to the Instruction Fault Status Register (IFSR) and the Data Fault Status Register (DFSR), and disabling of the MMU, Translation Lookaside Buffer (TLB) and Cache debug instructions, may only be allowed in a Secure Monitor Mode (SMM). Except the monitor segment, all kernel address space mapping (e.g., addresses≥0x80000000) do not allow writable and executable access permission at the same time. In some embodiments, the kernel text pages are not writable, and kernel data pages are not executable.

Entering "super-privileged" mode (i.e., Secure Monitor Mode) may be done by setting domain_monitor in DACR to "client access" (only allow access in privileged mode), and exiting SMM may be done by setting domain_monitor in DACR to "no access" and setting IFSR and DFSR to an invalid value.

During operating system (e.g., Linux) boot-up, init code may first enter the SMM in the security monitor segment, may enhance kernel page table and initializes for SSM, and may exit SMM before the rest of the kernel is initialized. After this, no privileged kernel code nor userland code may run in the SMM unless the kernel calls routines in the monitor segment or accesses the secure monitor segment. There are generally only a limited number of SMM entries in the kernel and all entries may be registered and may be checked in run-time when switching into SMM. In some embodiments, it is not possible to switch to SMM directly from user mode.

On a domain fault, the faulting PC may be checked against registered SMM entries and only registered entries may be allowed. On entry of SMM for memory mapping, there may be code to check physical addresses in the critical area that includes the secure segment, exception area and any other area that should not be remapped.

The API may include at least two calls for the security monitor, including calls for entering and exiting the Secure Monitor Mode (SMM). When the operating system boots, before it turns on the MMU, the Domain Access Control Register (DACR) may to be set to allow all domain access to be able to perform the initialization of the kernel and monitor. After the kernel memory map has been set up for the security monitor and kernel initialization is finished, the kernel may call the exit SMM routine for the first time to disable access to the monitor domain segment by the rest of the kernel and user code.

The code for exiting the Secure Monitor Mode should be located within the secure monitor segment (e.g., domain_monitor) in kernel address space.

The goal of running the exit secure monitor function is generally to execute non-SMM code, which may be untrusted. In this function, when DACR is still set to allow access for the domain_monitor, execution of this instruction remains in SMM. However, in one embodiment, the exit secure mode function includes changing the domain access rights, such as by writing to the DACR and/or ISB (Instruction Synchronization Barrier) to restrict access to the secure monitor segment. After writing to DACR and ISB, the MMU's view of domain access right has updated, and prefetch of the next instruction address (e.g., return_addr, which is located in the monitor segment) by the MMU would result in a prefetch abort, and hence branch to prefetch abort handler.

In embodiments, the exception vector area and exception handler may not be in the monitor segment, since if they are, the branch to exception vector instruction itself would trigger a new round of prefetch abort and the CPU will then enter an infinitive loop of generating prefetch aborts. Note that this situation will not compromise the secure monitor mode, since self-modifying kernel text segments are not possible, and modifying IFSR or DFSR can only be done in SMM, therefore, exploit code cannot make the PC jump to the exception handler and safely return to non-SMM code.

One challenge is how to return from the exception handler to the next instruction address and then continue to non-SMM kernel code after a genuine prefetch abort triggered by the exit secure mode function. In one embodiment, the solution may include using a continuation function. Before changing DSFR, the monitor may store the continuation function pointer for this task. In the prefetch abort handler, it checks if IFSR is a domain fault, and if so enters a domain fault handler. The domain fault handler checks if the faulting PC is the ISB instruction in the exit secure mode function, and if so branches to the continuation function.

Before writing DACR, however, there are 4 registers that have been pushed onto the kernel stack as part of C EABI function entry code to save other registers used in this function, as well as the return address for the calling function. The domain fault handler fixed the return program counter (PC), however, the kernel stack pointer (SP) has changed and the restore registers and return to calling function instruction ldm sp, {fp, sp, pc} is bypassed by the monitor's mechanism. The calling function is expecting the stack to point to sp_kernel(1), but it is actually pointing to sp_kernel(2). The stack must be repaired, therefore, before branching to the continuation function.

Since the number of the registers and which set of registers are pushed onto the stack vary with the ABI of the tool chain and the context that the exit secure monitor function is invoked, any change of the function calling arguments, or even the code in the this function, would cause the compiler to choose to push different set of registers. One solution is to implement the exit secure monitor in assembly. This will ensure the ABI is satisfied, and the code can easily read registers from the context in domain fault handler, and the fix stack as needed. After returning from the exception handler, floating point (fp) and stack pointer (sp) along with the program counter (pc) will be set to correct value.

The exit secure monitor function may be set in the security monitor segment by a Linux linker script. In embodiments, there may be only one exit routine of the SMM throughout the kernel so that the domain fault handler can always check if the faulting PC is the address of the instruction after the ISB in the exit secure mode function.

After exiting the Secure Monitor Mode (SMM), the operating system (e.g., Linux) may run in "normal" privileged mode, or user mode. There may be cases, however, where the operating system re-enters SMM from kernel mode.

For example, the SMM may be re-entered for monitoring kernel code behavior. These entries to the SMM may be in exception handlers, and the security rules for the kernel can be added here. For example, rules allowing or forbidding system calls can be added in the entry of SMM in swi_handler. Kernel integrity checking can be added into the SMM entry code in irq_handler, etc.

The SMM may also be re-entered for performing "super-privileged" operations. In embodiments, the kernel needs "super privileged" instructions to do kernel work. For example, change TTBR0 for switch_mm( ), change DACR for accessing user pages, etc. When the kernel needs to use these instructions, it may re-enter SMM.

The SMM may also be re-entered for accessing the security monitor segment. The kernel may sometimes need to access memory in the security monitor segment. For example, when adding kernel mappings, Linux Memory Management (MM) code may need to write to a kernel page table.

As a result, there could be more than one entry point into SMM within the kernel, and these entries may be tracked by monitor entry code. For each entry point, there may be an API function defined inside the security monitor segment that actually does the job. In one embodiment, all the non-SMM kernel code needs to do is call the API function.

The entering of SMM may also generate a prefetch abort exception, and a check for the faulting PC to see if this domain fault is caused by branching from a legitimate registered SMM entry. The check may be a linear search in an entry table in a read-only data segment in an exception handler section. The table may be generated at compile time, and all return virtual addresses of declared SMM entries may be added in that table. In embodiments, the table may not be located in security monitor segment since the domain fault exception handler cannot be running in SMM on ARM V6, and hence it cannot access security monitor segment. Thus, all entries to SMM in non-trusted kernel code may register themselves in the monitor entry table, and any other domain fault on the domain monitor segment would be an illegitimate access.

In Linux, different architectures have different degrees of hardware support for the kernel accessing user memory. This may be important for the performance for an Operating System. In the ARM V6 architecture, the instructions LDRT and STRT provide kernel access memory to memory in user mode (i.e. the MMU treats memory accesses issued by LDRT/STRT as if it was issued in user mode, even though the CPSR mode bits are set to none-user mode). The kernel uses these instructions to access user address spaces directly without generating page faults if the page is mapped in the user space. However, this is extremely dangerous for kernel implementations. If kernel code unintentionally uses LDRT/STRT on an incorrect but nevertheless mapped user address, there is no page fault generated, and user address space could be contaminated by kernel bugs.

Linux ARM V6 enables the use of the Domain Access Control Register (DACR) as a mechanism to prevent the kernel from accessing user memory. All user address space is associated with a different domain from the kernel space. If the kernel intentionally accesses user address space, it will change DACR to allow kernel access of user address space which has domain_user. If the kernel code unintentionally uses LDRT/STRT on user address space, domain access control denies access, and a domain fault is generated.

In embodiments implementing the security monitor, modifying the DACR may be a "super-privileged" instruction, therefore it has to be moved into the security monitor segment, and is tracked and monitored by SMM. In this embodiment, non-SMM kernel code cannot access user address space without registering with the security monitor. Self-modification of user address space by the kernel can also be prevented as long as the user page table has the domain set correctly (this may easily be guaranteed by putting the 1st and 2nd user page table in the security monitor segment, for instance).

In embodiments, the kernel may prevent nested entry into SMM. Embodiments may allow a security monitor entry function to calls another secure monitor entry. In this case, the second entry of SMM does not cause a domain fault, since it's already in SMM, but its exit secure monitor routine does exit SMM. The subsequent return calling code is then executed in non-SMM mode. When branching to the exit secure monitor function for the second time, a domain fault is generated since the exit secure monitor is in the monitor segment. However, the return address of the second exit secure monitor is not a registered SMM entry, and is detected by domain fault handler and treated as an error. Therefore, there may be code at the entry of SMM to check the SMM mode and not perform the exit secure monitor function if it is determined that it is a nested entry.

The Security Monitor Mode (SMM) may provide a framework or a secure vault for critical kernel data and code. Security algorithms and checks can be put inside this secure area and monitor the rest of the kernel and user behavior.

In embodiments, security related global data can be placed in the SMM segment, and then can be used by security algorithms. For example, if any of the algorithms implements a state machine, the state (or other context information) can be reside in the SMM segment and be safe from non-SMM code.

One important state in the various embodiments is the current Security Mode of the EI 102. Upon calling a special system call to switch security modes, system call monitoring code may change the security mode according to the parameter of this system call. The current security policy may then change depending on the new security mode. This global variable should not be accessed by non-SMM code, and SMM protection mechanisms can guarantee that.

In embodiments, system call monitoring resides in the entry of SMM in an interrupt handler (e.g., swi_handler). All Linux system calls must to pass the system call security policy check to reach the OS (e.g., Linux) system call handler. System call monitoring code has access to the kernel context of the SWI exception and userland parameters of the system call. It can perform any security policy check on both kernel space and user space. The security policy can be defined at compile time and be built into the SMM segment as well (with proper signature verification), as it is a data structure with a function pointer to a function with which to do the check, and other policy data associated with the function. There may be a static array of security policy maps to each OS (e.g., Linux) system call. At run time, the check function defined for the system call number may be called to perform the policy check for a given system call, and if the check fails, the interrupt (SWI) may return directly with an error number and never actually reaches a Linux system call handler which is located outside the SMM segment.

In embodiments, at least two mechanisms may be used to prevent the run-time modification of kernel code, rodata, and security monitor code: address space protection and run-time hashing. In embodiments, non-SMM code may not access kernel address space, as the only way to do so is through SMM entry in a mapping function (e.g., vmap). In the SMM entry of the mapping function, the code forbids any mapping (including DMA mapping) of physical frames that overlap above the critical area, and thus prevents any writes to physical RAM of above that area.

Run-time hashing may include a redundancy check to ensure the first mechanism has not failed in some way, or that an adversary has not physically altered a portion of memory. This mechanism may involve choosing random (e.g., 4K) pages, performing a cryptographic hash (e.g., SHA256) on the page. The system may compare the digest to statically generated digest values, and any differences may result in a system panic or other exceptions.

Since run-time integrity checking is processor-intensive and may impact cache and system performance in general, the frequency may be configurable in the security policy definition in various embodiments.

As discussed above, embodiments include an EI 102 having plurality of security policies corresponding to different operating modes, where the EI 102 may operate in a single mode at any different time. Mode switching enables the EI 102 to switch between different security policies at runtime, providing better security than sandboxing or virtualization alone by introducing further robustness through temporal isolation.

Figure 9:
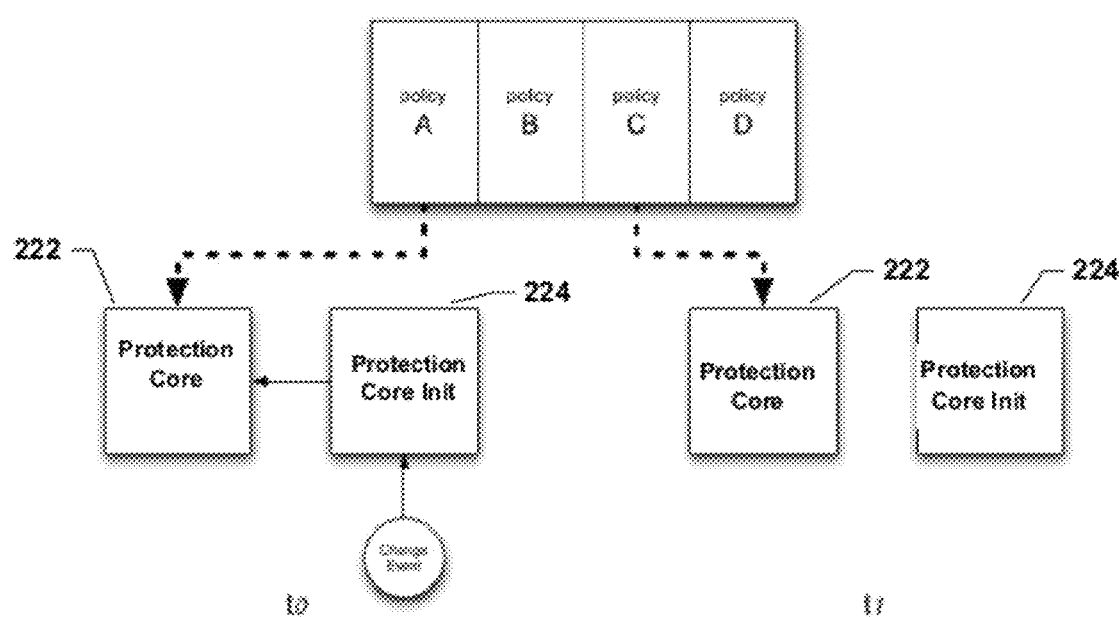
FIG. 9 illustrates a mode switch between a first security policy and a second security policy.

The protection core init subsystem 224, which is illustrated in FIG. 2, may process the change to a new security policy, and may inform the protection core 222 of the corresponding change in mode so that the protection core 22 may enforce the new policy. A mode switch according to one embodiment is illustrated conceptually in FIG. 9. In this example, the EI has four security policies (Policies A-D), which may be stored in memory on the EI 102. The protection core init subsystem 224 may change the governing security policy from Policy A to Policy C at time t0, and the protection core 222 may begin to enforce policy C at t1. The EI may thus operate in a new mode.

In one embodiment, when a mode switch occurs, the old mode is completely deactivated, its processes are killed, and memory zeroed. This generally does not effect apps or non-volatile storage, nor does it preclude the protection core init 224 from encrypting and storing the contents of any memory and restoring that memory when the mode is re-activated, but it does provide strong temporal isolation between processes running under different security policies.

The protection core init 224 subsystem may provide a flexible mode switch API to indicate that it should initiate a mode change, and from there on its behavior may be driven by the current and indicated policy. In various embodiments, the mode switch API provides a way for apps, processes, and other EI subsystems to initiate a mode change. For example, a timer could indicate that a mode change must occur each evening at a specified time, an app could request a mode change each time it sees a particular wireless network appear, or a user could write their own app with its own user interface, etc.

Figure 10:
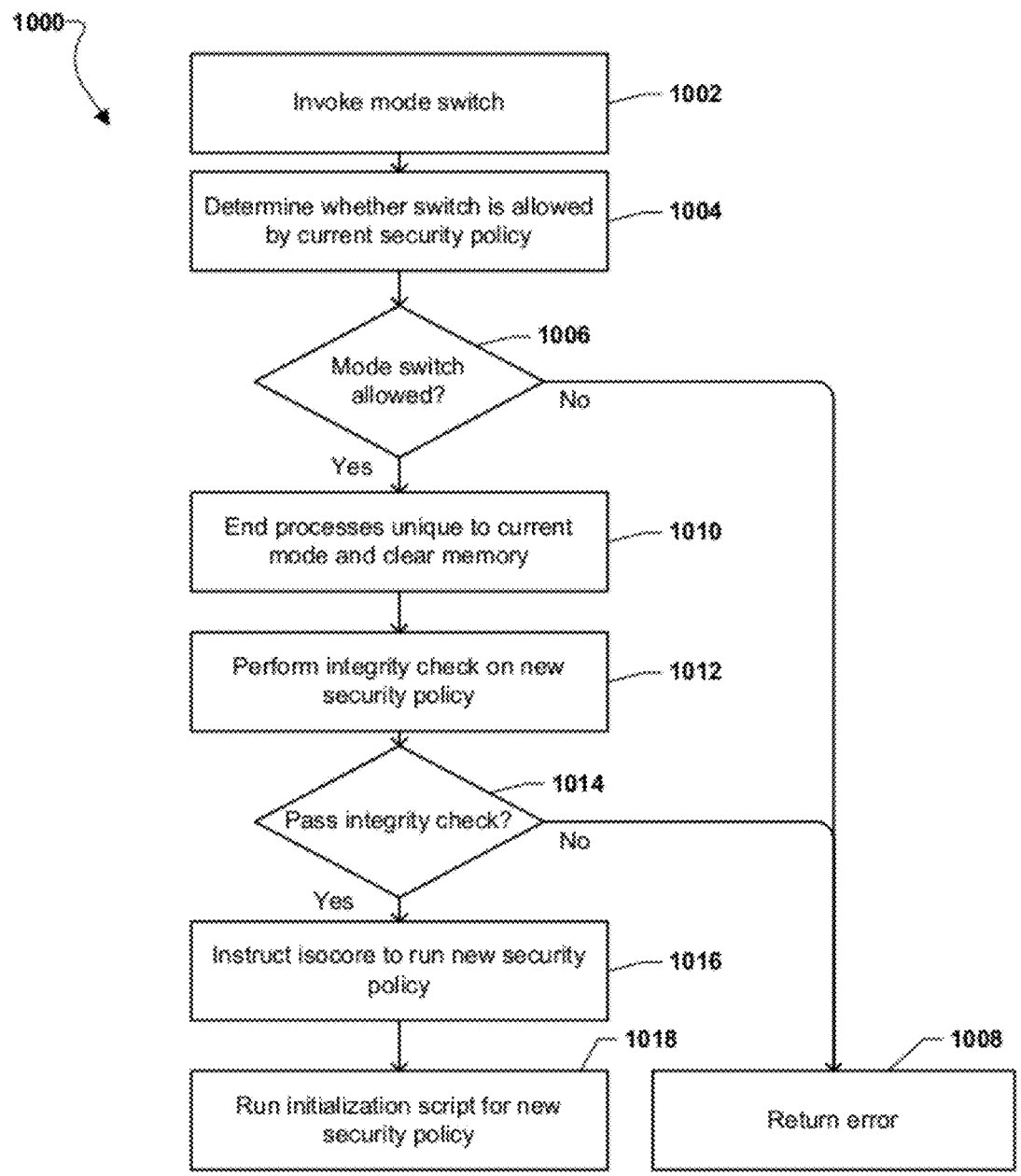
FIG. 10 is a process flow diagram illustrating an embodiment method for mode switching using a mode switch API.

FIG. 10 is a process flow diagram illustrating an embodiment method 1000 for mode switching using a mode switch API. When the mode switch API is invoked at block 1002, the protection core init 224 may determine if the switch to the desired mode is permitted given the current policy in block 1004. If not, (i.e., block 1006=No), the protection core init 224 may return an error in block 1008. If the mode switch is allowed (i.e., block 1006=Yes), then processes unique to the current mode may be ended and the memory cleared in block 1010. The integrity of the new policy may be checked at block 1012. The integrity check may performed using the API. If the new policy passes the integrity check (i.e., block 1014=Yes), then the API may instruct the protection core 222 to run the new policy in block 1016. The initialization script for the new security policy may be run in block 1018. This may include passing a single opaque argument of arbitrary size from the mode switch call as an argument to the init script. If the applicable security policy indicates, the EI 102 may be placed in a locked state until it is unlocked via a protection core init lock API.

The API may be a system call, and is thus controlled by the system call monitoring, and access is defined by the current policy in place. A binary executable could also place the system call, in which case the file could also fall under the control definitions of the current policy.

In embodiments, the protection core init 224 subsystem may run the initialization script (e.g., init.rc in the case of ANDROID™), and may make the calls into the protection core 222 to place the processes launched during the running of the script into the proper categories, as defined by the applicable security policy. In embodiments, only the protection core init 224 may have this capability, and only the protection core init 224 may be in the special "INIT"

category, described above. For each process in the init script, the protection core init 224 may inform the protection core 224 of the category in which to place subsequent forks from the protection core init 224 into, unless the category has been set and has not changed since the previous fork. If the fork is to launch a binary executable, the protection core init 224 may look in the current policy for a hash or key to decrypt or verify the integrity of the executable, and may do so via the protection core's API. If the security policy marks the process about to be launched as re-spawnable, the protection core init 224 may add the process ID to a list of processes to re-spawn.

The protection core init 224 subsystem may also be responsible for respawning certain processes, as specified in the security policy. In embodiments, various process and their data may be moved around, which may provide a level of biomorphic security for the EI. The protection core init 224 subsystem may pseudorandomly kill and re-spawn certain processes that were marked as willing to be so in the init script. After a pseudorandom number of clock ticks equal to between once and twice the period specified in the policy, protection core init 224 may chose a process, preferably pseudorandomly, from the list of processes to re-spawn, and kills and re-spawns the process.

The protection core client subsystem 226, which is illustrated in FIG. 2, may communicate with the policy server 104 to download policies, commands, and other data. The protection core client 226 may also communicate with the protection core init 224 as required to process the incoming data, and may send the policy server 104 any request data about the status of the EI 102.

The governing security policy includes at least two important characteristics for the protection core client 226: the policy server(s) 104 with which the protection core client 266 may communicate, and when these policy server(s) 104 may or must be contacted.

The list of policy servers, each as an attribute to the policy server characteristic of the policy, contains one or more policy server(s), where a policy server may be defined by: an ID used as a tag or reference; an IP address or hostname (one of these should be unique in the list); a user name; a password; an X.509 or similar server certificate or certificate chain to verify the identity of the server; an X.509 or similar client certificate to use when accessing this policy server; a list of supported authentication methods in order starting with the most preferred to least preferred; a list of supported Transport Layer Security (TLS) cipher suites in order starting with the most preferred to least preferred; and/or a priority for the particular policy server over other servers, which may be expressed as an integer from 0-255 where 0 is the highest priority.

The governing security policy may also determine how frequently the protection core client 226 contacts a policy server 104 and requests new data and commands. Since EIs 102 are likely to be in a mobile environment where their IP addresses and availability on the network are fluid, in preferred embodiments the protection core client 226 will contact a policy server 104 on a periodic basis.

Figure 11:
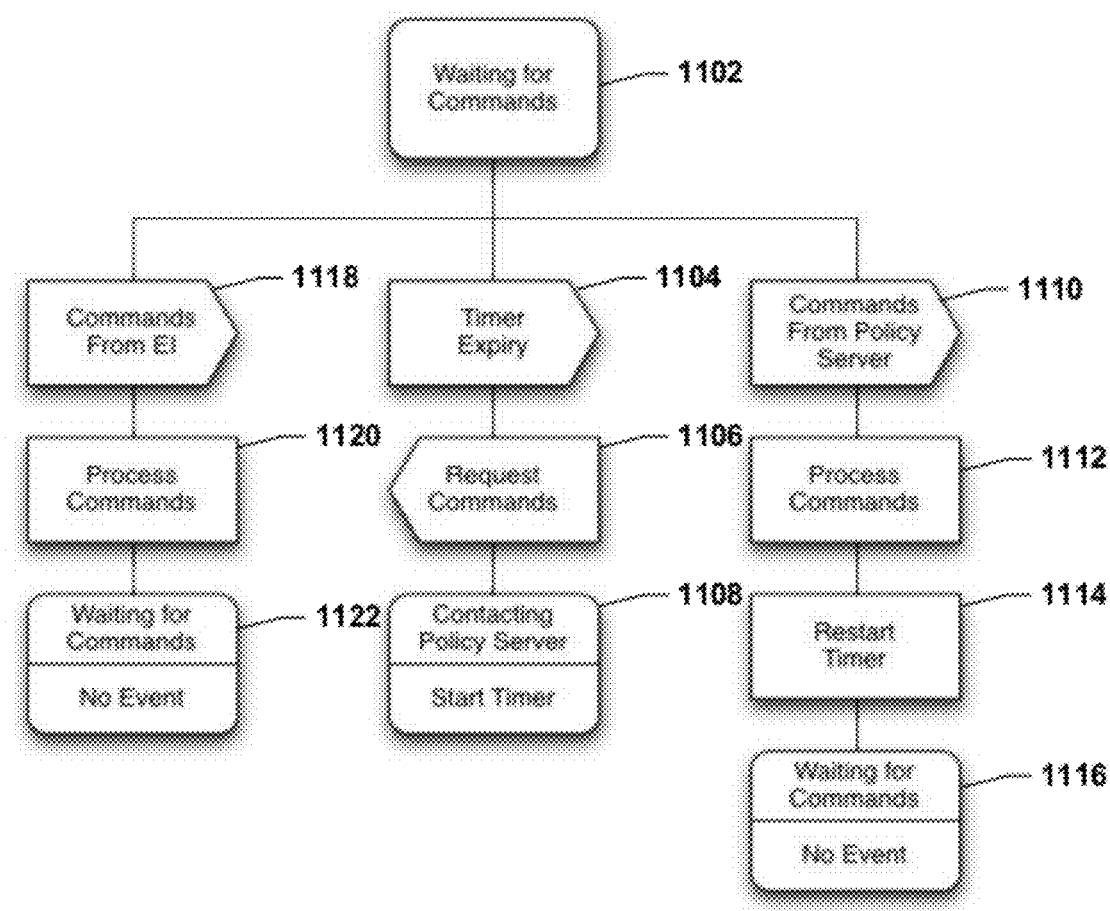
FIG. 11 is a flow diagram illustrating the call flow for the protection core client.

FIG. 11 is a flow diagram illustrating the call flow for the protection core client 226 according to one embodiment. The isocore client 226 may operate in a never-ending loop, obeying the policy characteristics shown in FIG. 11. The protection core client 226 may wait for commands, as shown in block 1102. Upon the expiration of a timer at block 1104, the duration of which may be determined by the security policy as discussed above, the protection core client 226 may initiate a request for commands (block 1106), contact the policy server and start the timer in block 1108. When a command from a policy server is received (block 1110), the protection core client 226 may process the command in block 1112, and restart the timer in block 1114. The client 226 may then wait for commands in block 1116. The protection core client 226 may also receive commands from other processes running on the EI 102 in block 1118, process the commands in block 1120, and wait for more commands in block 1122.

In embodiments, when the protection core client 226 contacts a policy server 104, it may select which policy server to contact from the list of policy servers, as described above. It may do so by selecting the server with the lowest priority number. If, however, the protection core client 226 is unable to reach this policy server on its last attempt, the protection core client 226 may set an error flag on the server and move to the next policy server in the list. Upon the first successful, complete dialog with the policy server, the protection core client 226 may ignore all previous error flags.

If several policy servers have the same priority, the protection core client 226 may choose among them in an arbitrary order, including pseudorandomly or by selecting the server with the lowest number of connection errors from previous attempts.

As part of attestation with the network or another EI, the EI 102 may be asked to report the time it last contacted a policy server 104, either to a policy server or to another EI. The EI 102 has several choices for policy server attestation, including immediate and stored attestation.

In immediate attestation, any client (or indeed a server the EI is attempting to contact, but in this case that server is the attestation client) may provide the EI a pseudorandom value, and optionally ask for other data the EI may have or for the EI to calculate certain results. The EI 102 may cryptographically sign the requested results and the pseudorandom data with its own private key, and send the resulting signature to the requesting client. If the EI is truly the correct EI, and the client has the public key of that EI, the signature should be valid. If not, the EI is an impostor, does not have the proper data, or is not in the proper state.

In stored attestation, at any time, most likely as directly by the current policy, the protection core client 226 may request an attestation value from the policy server 104. The protection core client 226 may store this value, and be prepared to offer it to anyone who asks as proof that the client 226 did indeed communicate with the policy server.

Attestation mechanisms are independent of the data involved, which could include anything from a hash on the EI's firmware to a timestamp from a trusted NTP or other network clock source.

The protection core client 226 may communicate using HTTP over TLS, but in embodiments may not support the complete HTTP protocol, but rather only a small, limited subset that may be designed to work with the policy server and still be compatible with arbitrary commercial HTTP servers.

For transmission of security policies and/or other security data, the protection core client 226 may use a policy transmission protocol such as described above in connection with FIGS. 6, 7A and 7B, and the transmission may be wrapped inside TLS and use a cipher suite dictated by the policy server upon establishing a connection.

The protection core client 226 may process and store data from policy sets, including files to save on the EI's file system and firmware updates. Firmware may be encrypted, compressed, or in a variety of formats that are device specific. The process for writing to non-volatile storage and flashing new firmware is also device specific. In addition to storing data from the policy server, the protection core client 226 may process all the commands from the policy server, including mode switches, which involves performing any protection core client 226 actions and then subsequently informing the appropriate subsystems of the command.

Embodiments also include a protection core weaver 314, which is illustrated in FIG. 3. The protection core weaver 314 may run on a server, such as policy server 104 in FIG. 3. In one embodiment, the protection core weaver 314 is a tool that generates a firmware image for an EI or set of EIs. The firmware image may be a copy of a particular version of the system firmware with associated metadata. The protection core weaver tool may be available to authorized administrators only, and may be accessed via the policy server's Web-based administration tools or via a Linux or Unix command line interface.

The protection core weaver 314 may include a number of specific capabilities for generating a firmware image. For example, the protection core weaver 314 may be able to generate keys and certificates for individual EIs or groups of EIs. Certificates are typically X.509 format, and all cryptography is typically NSA suite B.

The protection core weaver 314 may also include a scramble cipher function. In one embodiment, the protection core weaver 314 may never place any keys into any file as plaintext, or transmit them as plaintext even when the transport protocol provides encipherment. In the event the keys are not covered with a secondary encryption scheme, the protection core weaver 314 may use a scramble cipher as described above.

Figure 12:
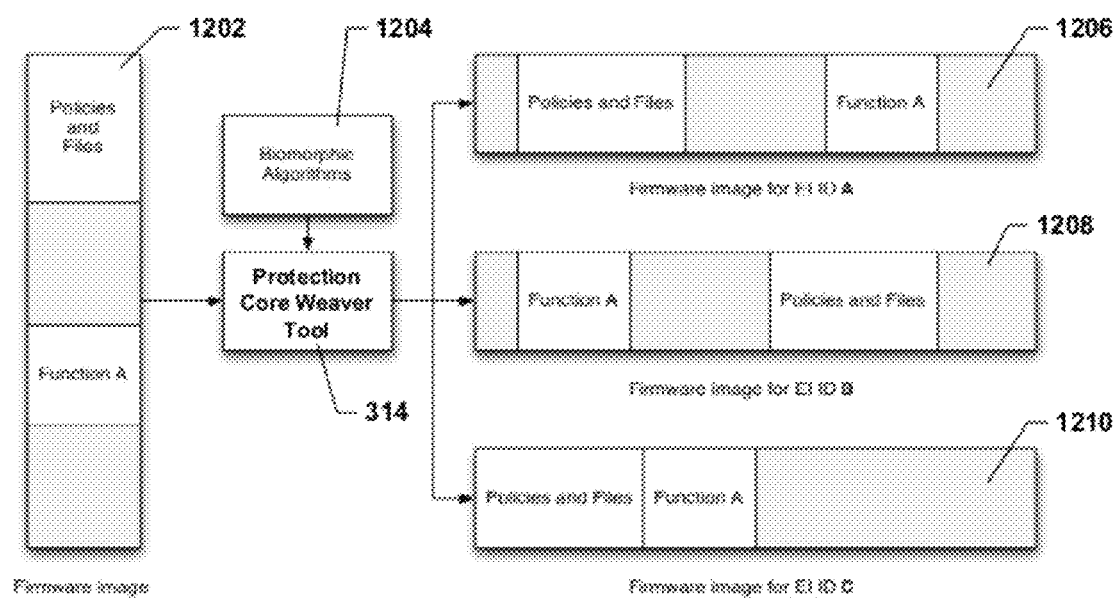
FIG. 12 illustrates biomorphic modification to a firmware image according to one embodiment.

The protection core weaver 314 may also provide image generation. In one embodiment, the protection core weaver 314 may take all data, commands, and policies for an EI or group of EIs, and packages them into forms that the protection core client 226 (and ultimately other subsystems of the protection core 222) can understand. The protection core weaver 314 may then package this data into a single file for the policy server 104. In doing so, the protection core weaver 314 may in some embodiments use biomorphic algorithms to place data in different offsets in the firmware image for different EIs. This is schematically illustrated in FIG. 12, which shows a firmware image 1202 containing a set of data, including policies and files and a function (Function A) in a first configuration. The protection core weaver 314, implementing one or more biomophic algorithms 1204, may modify the firmware image by applying different offsets to the data contained therein to produce modified firmware image files 1206, 1208, 1210 for three different EIs (i.e., EI A, EI B, EI C).

After generating a firmware image, the protection core weaver 314 may store the image for the policy server 104 to transmit to an EI.

The policy server 104 may support the delivery of data and commands to the EIs, editing of policies, creation of firmware images, and all attestation requirements. The policy server is generally the most security-critical architectural element of the security solution, as its compromise could result in sending unauthorized policies to the EIs. For this reason the policy server may use a more robust operating system than traditional servers, along with specialized software to fulfill its primary tasks.

The policy server may communicate with EIs via HTTP inside TLS (HTTPS), but since the policy server is a fixed architectural element in terms of the network, even when part of a mobile tactical network, it may be the HTTP server where the EIs and authorized desktops and other devices are the clients.

Preferably, the policy server does not use a commercial HTTP server for the security reasons noted, but rather a specialized real-time embedded server designed specifically to provide enhanced security by scanning for properly formatted requests for known resources. In some embodiments, the policy server may have its own security policy, which an authorized administrator can configure using the policy server's Web-based administration.

Embodiments may also include a policy editor 312, such as shown in FIG. 3. The policy editor 312 may be a Web-based tool to create and edit policies and policy sets, or templates to use in their subsequent creation. The policy editor 312 may run on the policy server 104, as shown in FIG. 3.

In embodiments, the policy editor 312 allows an authorized administrator to edit all aspects of the policy, while hiding as much of the complexity as possible. Every aspect of the policy may be editable from the policy editor, however, the editor may present the administrator with the opportunity to use multiple views and templates. Views may determine what characteristics and attributes are visible on the master editing page, and may create a map of links to other maps on which those named characteristics are editable. File uploads, editors, and other UI of pages may all be specified using a view. By authoring a view, an administrator can place the most commonly changed elements on the first page they see, and relegate the more esoteric aspects of policy management to several links deep. In preferred embodiments, views are stored in the policy server's database 306.

In some embodiments, in the same way an authorized administrator can create views, they may also create policy and data templates. These templates can map to specific IA policies (e.g. FISMA frameworks, NIST guidelines, STIGs, etc.). Templates may also be stored in the policy server's database 306.

The policy editor 312 may also provide an analysis of how robust the policy is, by looking for key problems or issues such as: dead or cyclic policy change attributes that would create a condition where once the EI is in a particular policy, it could never transition to a given other policy; overlapping access rights, especially for file system write access; a measure and description of deviation from established policy templates; no access to the mode switch or other important system calls (the system may become unusable); too many or inappropriate categories with access important system calls (the system may become less robust); requiring an integrity check on a file or other resource but not specifying it in the policy (because that would mean it is stored by the EI at an unknown security posture); use of plaintext keys or passwords, or other data that appears sensitive as plaintext, etc.

Such an analysis may produce a policy strength assessment that goes into the firmware image, and networks and EIs may request this assessment as part of the measurement for attestation. This would prevent EIs with less robust policies from accessing some networks or resources, such as communicating with EIs which require a higher policy assessment level.

The policy server may store all images, policies, and other data in a database 306 for easy searching and retrieval. Given that images may created for individually for EIs, however, and that there may be millions of EIs, the database may not contain every image, but rather digital signatures of the images.

The policy server 104 may provide a Web-based editor for text files, and may also allow for the download and upload of arbitrary text and binary files per the policy server's security policy. For example, binary data is not allowed in an upload of "init.rc", an ANDROID™ Initialization script which should contain only text.

When saving the data, the administrator can choose to save a digital signature of the file as well.

A command editor may be used to send commands to an EI or group of EIs. Commands are sent as policy commands, however since the EI may not be listening at any given time, commands may be "pulled" from the policy server when the EI makes it's next request from the policy server. For this reason, when an administrator stores a command for an EI or group of EIs, it may be stored in the database 306, and then delivered, and the delivery history updated in the database, upon the next connection by the EI. The threat library is a portion of the database 306 that EIs may query to determine if an application, another EI, a network, or other resource is a known threat or a known safe resource. The database 306 may be broken up into three types of entries, those for attestation, Violations, and known adversaries.

Attestations: The attestation entries in the library contain the IDs of EIs that either have performed or need to perform attestation, and the associated status and parameters.

Violations: The violation entries in the library contain the IDs of EIs that have reported violations, and the specifics on the violations they have reported. The number and type of violation may determine the security posture of the EI and the behavior or authenticity of the user, and so any authorized EI may query as to the status on the violations of another EI before entering into a transaction (e.g. a VoIP call) with that EI. The policy server itself may also use this part of the library to form commands for the EI, such as telling an EI to change policies or to require re-authentication of its user.

Known adversaries: The known adversaries entries in the library contain information on entities known to be hostile or compromised. These entities could include, but are not limited to: networks, EIs, applications (as defined by a SHA256 hash or other signature), server host names, domain names, IP addresses or address ranges, URLs or URIs (Web sites, FTP servers, and other online resources).

The EIs may query these entries, however it is more likely that this information will be useful in authoring and checking the strength of policies before sending them to EIs, or in determining, via an addition to these entities, if new policies are required.

In embodiments, the policy server may act as the primary key server, or there may be an external key server distinct from the policy server. The key server may send cryptographic keys to the EIs and respond to queries for keys, key material, and encipher/decipher messages from the EIs and other servers. The key server may also have the ability to generate keys for servers and EIs.

The key server may store all keys in a key database, however no private keys are stored as plaintext (i.e. private keys are encrypted) even locally on the key server in the database, in memory, and anywhere else they may be used. Private keys are only decrypted for short periods of time as needed for decryption, and plaintext versions are immediately erased.

When a plurality of policy servers 104 act in a cluster, they may share their databases or perform database duplication and replication. Nothing other than network configuration that is specific to a policy server is stored anywhere other than in the database.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A method of operating an End Instrument (EI) in a first security mode defined by a first security policy and a second security mode defined by a second security policy, comprising:
    initiating operation of the EI in the first security mode defined by the first security policy by launching an operating system kernel that is defined by the first security policy, wherein the first security mode as defined by the first security policy determines a first set of processes that the EI is authorized to execute;
    placing the first set of processes in categories to operate the EI in the first security mode as specified by the first security policy, as the processes are created on the EI;
    running the first set of processes on the EI so that behavior of the EI is defined by the first security policy when operating in the first security mode;
    intercepting calls to the operating system kernel from the first set of processes running on the EI;
    for each call from a process of the first set, determining whether the call is allowed under the first security policy based on the category of the process of the first set making the call;
    passing calls to the operating system kernel only when allowed by the first security policy;
    receiving an instruction to switch from the first security mode defined by the first security policy to the second security mode defined by the second security policy;
    determining whether the switch from the first security mode to the second security mode is allowed under the first security policy;
    terminating operation of the EI in the first security mode defined by the first security policy by terminating the first set of processes running on the EI in the first security mode before switching from the first security mode to the second security mode when allowed by the first security policy;
    switching operation of the EI in the first security mode defined by the first security policy to the second security mode defined by the second security policy so that behavior of the EI is defined by the second security mode; and
    initiating operation of the EI in the second security mode defined by the second security policy by launching the operating system kernel that is defined by the second security policy wherein the second security mode defined by the second security policy determines a second set of processes that the EI is authorized to execute,
    wherein operation of the EI in the second security mode and the second security policy is respectively distinct from operation of the EI in the first security mode and the first security policy so that after the EI has launched the operating system kernel the EI operates in either the first security mode or the second security mode over any single time period when the operating system kernel is launched.

2. The method of claim 1, further comprising:
    performing an integrity check as specified by the first security policy, wherein performing the integrity check is selected from the group consisting of:
    performing a cryptographic hash on specified data in the EI and comparing the result to a known value to verify the data has not been altered accidentally or maliciously;
    performing a boot check of an entire EI firmware image;
    performing a known-answer-test on at least one cryptographic routine to verify that the cryptographic routine returns an expected result;
    performing the integrity check on one or more of a security policy, an operating system kernel, and an isolation core; and
    performing the integrity check by entering a Secure Monitor Mode (SMM) in the operating system kernel, where the SMM has a higher privilege than normal kernel or user modes.

3. The method of claim 1, further comprising:
    sending a request for a new or updated security policy; and
    receiving the new or updated security policy in response to the request.

4. The method of claim 3, wherein requesting a new or updated security policy comprises:
    sending a request for a new or updated security policy to another entity;
    receiving a first blurred data block from another entity;
    decoding the first blurred data block to determine a length of the security policy being transmitted;
    creating a second blurred data block containing characteristics of a selected requested portion of the security policy to transmit; and
    sending the second blurred data block to the other entity;
    and wherein receiving the new or updated security policy comprises receiving the selected requested portion of the security policy from the other entity.

5. The method of claim 1, further comprising:
    receiving a command; and
    processing the command in accordance with the first security policy.

6. The method of claim 1, further comprising:

scrambling security policy data; and
storing the scrambled security policy data on the EI.
7. The method of claim 1, further comprising:
selecting a layer of pseudorandom number generation;
selecting a mode of pseudorandom number generation;
generating a pseudorandom number in accordance with the selected layer and the selected mode.
8. The method of claim 1, further comprising:
scrambling cryptographic material using a scrambling function; and
storing the scrambled cryptographic material on the EI.
9. The method of claim 1, further comprising:
running a cryptographic function, and
providing pseudorandom delay before providing a return for the cryptographic function.
10. The method of claim 1, further comprising:
running a selected cryptographic function;
performing one or more spin cycles by calling additional cryptographic routines and/or performing read accesses on pseudorandom memory areas; and
providing a return for the selected cryptographic function.
11. The method of claim 1, further comprising:
detecting a violation of a security policy; and
in response to the violation, performing at least one action specified by the security policy, wherein at least one action is selected from the group consisting of ignoring the violation, logging the violation, informing a policy server of the violation, changing to a different security mode, erasing data from the EI, locking data using encryption, locking the EI, and rebooting the EI.
12. An end instrument (EI), comprising:
a processor configured with executable instructions capable of operating the EI in a first security mode defined by a first security policy and a second security mode defined by a second security policy, the instructions comprising:
initiating operation of the EI in the first security mode defined by the first security policy by launching an operating system kernel that is defined by the first security policy, wherein the first security mode as defined by the first security policy determines a first set of processes that the EI is authorized to execute;
monitoring operations of the operating system kernel in accordance with the first security mode defined by the first security policy;
placing the first set of processes into categories to operate the EI in the first security mode as specified by the first security policy, as the processes are created on the EI;
running the first set of processes on the processor so that behavior of the EI is defined by the first security policy when operating in the first security mode;
intercepting calls to the operating system kernel from the first set of processes running on the processor;
for each call from a process of the first set, determining whether the call is allowed under the first security policy based on the category of the process of the first set making the call;
passing calls to the operating system kernel only when allowed by the first security policy;
receiving an instruction to switch from the first security mode defined by the first security policy to the second security mode defined by the second security policy;
determining whether the switch from the first security mode to the second security mode is allowed under the first security policy;
terminating operation of the EI in the first security mode defined by the first security policy by terminating the first set of processes running on the EI in the first security mode before switching from the first security mode to the second security mode when allowed under the first security policy;
switching operation of the EI from the first security mode defined by the first security policy to the second security mode defined by the second security policy so that behavior of the EI is defined by the second security mode;
initiating operation of the EI in the second security mode defined by the second security policy by launching the operating system kernel that is defined by the second security policy, wherein the second security mode defined by the second security policy determines a second set of processes that the EI is authorized to execute;
wherein operation of the EI in the second security mode and the second security policy is respectively distinct from operation of the EI in the first security mode and the first security policy so that after the EI has launched the operating system kernel the EI operates in either the first security mode or the second security mode over any single time period when the operating system kernel is launched.
13. The EI of claim 12, wherein the executable instructions further comprise:
performing an integrity check as specified by the first security policy.
14. The EI of claim 12, wherein the executable instructions further comprise:
receiving the first security policy and the second security policy from a policy server.
15. The EI of claim 12, wherein the executable instructions further comprise:
determining a violation of the first security policy.
16. The EI of claim 12, wherein the executable instructions further comprise:
taking an action as specified by the first security policy in response to the violation.
17. The EI of claim 16, wherein the action taken is a graduated response based on a number of violations of the first security policy.
18. The EI of claim 12, wherein the executable instructions further comprise:
receiving a command; and
processing the command in accordance with the first security policy.
19. The EI of claim 12, wherein the executable instructions further comprise:
scrambling cryptographic material using a scrambling function; and
storing the scrambled cryptographic material on the EI.

* * * * *